US011056851B2

(12) United States Patent
Mabuchi et al.

(10) Patent No.: US 11,056,851 B2
(45) Date of Patent: Jul. 6, 2021

(54) TERMINAL INSERTION DEVICE

(71) Applicant: Yazaki Corporation, Tokyo (JP)

(72) Inventors: Miyoshi Mabuchi, Makinohara (JP); Nobuto Tsukiji, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/906,081

(22) Filed: Jun. 19, 2020

(65) Prior Publication Data

US 2020/0321742 A1 Oct. 8, 2020

Related U.S. Application Data

(63) Continuation of application No. PCT/JP2018/042318, filed on Nov. 15, 2018.

(30) Foreign Application Priority Data

Jan. 24, 2018 (JP) ............................ JP2018-009401

(51) Int. Cl.
*B23P 19/00* (2006.01)
*H01R 43/20* (2006.01)
(Continued)

(52) U.S. Cl.
CPC ......... *H01R 43/20* (2013.01); *H01B 13/0003* (2013.01); *H01R 4/183* (2013.01);
(Continued)

(58) Field of Classification Search
CPC ... H01R 43/20; H01R 43/055; Y10T 29/5193; Y10T 29/53209; Y10T 29/53213; Y10T 29/49181; Y10T 29/53235; Y10T 29/53243; Y10T 29/49174; Y10T 29/53217; Y10T 29/5327; Y10T 29/51
(Continued)

(56) References Cited

U.S. PATENT DOCUMENTS 6,244,901 B1 * 6/2001 Fujii ..................... H01R 4/185
439/595
2019/0372291 A1 12/2019 Mabushi et al.

FOREIGN PATENT DOCUMENTS

JP 7-130450 A 5/1995
JP 2012238437 * 12/2012
JP 2018-170090 A 11/2018

* cited by examiner

*Primary Examiner* — Thiem D Phan
(74) *Attorney, Agent, or Firm* — Sughrue Mion, PLLC

(57) ABSTRACT

A terminal insertion device is provided which enables inserting connector terminals into terminal accommodating chambers of a connector housing, each of the connector terminals being connected to an end of each of a plurality of electric wires in a multi-core cable by crimping, while reducing the separation length for the plurality of electric wires. The terminal insertion device comprises: a terminal separator configured to be interposed between two connector terminals; a terminal chuck configured to clamp and bundle the two connector terminals in two directions, i.e., in a first direction intersecting an insertion direction and in a second direction intersecting the insertion direction and the first direction; and a moving mechanism configured to move at least one of a connector housing and the two connector terminals held by the terminal separator and the terminal chuck to insert the two connector terminals into two terminal accommodating chambers.

8 Claims, 15 Drawing Sheets

(51) Int. Cl.
*H01B 13/00* (2006.01)
*H01R 4/18* (2006.01)
*H01R 43/048* (2006.01)

(52) U.S. Cl.
CPC ...... *H01R 43/048* (2013.01); *Y10T 29/53213* (2015.01); *Y10T 29/53217* (2015.01)

(58) Field of Classification Search
USPC ......... 29/748, 729, 747, 749, 751, 753, 757, 29/760, 761, 854, 857, 861, 874
See application file for complete search history.

TERMINAL INSERTION DEVICE

BACKGROUND OF THE INVENTION

Technical Field

The present invention relates to a terminal insertion device for inserting a plurality of connector terminals into a plurality of terminal accommodating chambers in a connector housing.

Background Art

Conventionally, a terminal insertion device is known which is configured to insert a connector terminal into a terminal accommodating chamber in a connector housing, the connector terminal being provided at a tip of an electric wire, in order to produce an electric wire with a connector attached to the tip of the electric wire. Many of such terminal insertion devices have a configuration in which an electric wire with a terminal is held to be inserted into the terminal accommodating chamber. In this case, the following electric wire chuck device is proposed as an example of a mechanism for holding such an electric wire with a terminal (see e.g. Patent Document 1): The electric wire chuck device according to Patent Document 1 is provided so as to hold the electric wire horizontally by gripping an electric wire portion near a connector terminal of the electric wire with the terminal at two longitudinal locations of the electric wire. The insertion of the connector terminal into the terminal accommodating chamber is performed with the electric wire being held horizontally in this manner.

CITATION LIST

Patent Literature

Patent Document 1: JP H07-130450 A

SUMMARY OF THE INVENTION

In recent years, demand for multi-core cables as high frequency cables is expected to increase. In some cases, connector terminals which are connected to respective ends of electric wires of such a multi-core cable by crimping should be inserted into terminal accommodating chambers in a connector housing. Here, in order to hold electric wire portions near the connector terminals with the electric wire chuck device as described above, a certain length for the electric wire portions is needed. Accordingly, in order to insert connector terminals for a plurality of electric wires in the multi-core cable with such an electric wire chuck device, it is necessary to remove a coating of the multi-core cable across a significant length and separate the plurality of electric wires in order to allow them to be held individually. On the other hand, from the aspect of a high frequency characteristics of the multi-core cable, there is the need for reduction of a separation length of the separated electric wire portions as much as possible.

Therefore, the present invention is focused on the problems as described above, and an objective of the present invention is to provide a terminal insertion device which enables inserting connector terminals into terminal accommodating chambers of a connector housing, each of the connector terminals being connected to an end of each of a plurality of electric wires in a multi-core cable by crimping, while reducing the separation length for the plurality of electric wires.

In order to achieve the objective as described above, a terminal insertion device according to the present invention is configured to insert a plurality of connector terminals into a plurality of terminal accommodating chambers arranged in parallel to each other in a connector housing, each of the plurality of connector terminals being connected to an end of each of a plurality of electric wires by crimping, and includes: a terminal separator configured to be interposed between the plurality of connector terminals so that tips of the plurality of connector terminals are allocated to inlets of the plurality of terminal accommodating chambers in a one-to-one manner when the plurality of connector terminals are bundled extending along an insertion direction into the plurality of terminal accommodating chambers; a terminal chuck configured to clamp and bundle the plurality of connector terminals in two directions, with the terminal separator interposed between the plurality of connector terminals, wherein one of the two directions is a first direction intersecting the insertion direction and another of the two directions is a second direction intersecting the insertion direction as well as the first direction; and a moving mechanism configured to move at least one of the connector housing and the plurality of connector terminals held by the terminal separator and the terminal chuck to insert the plurality of connector terminals into the plurality of terminal accommodating chambers.

According to the terminal insertion device of the present invention, the plurality of connector terminals is bundled by clamping them in the two directions by the terminal chuck to be inserted together into the plurality of terminal accommodating chambers in the connector housing. At this time, since the plurality of electric wires is not held individually near the connector terminals, it is sufficient to separate the electric wires to such an extent that the tips of the plurality of connector terminals can be arranged allocated to the inlets of the plurality of terminal accommodating chambers in a one-to-one manner. Accordingly, the terminal insertion device according to the present invention allows a separation length of the plurality of electric wires to be reduced, as compared to inserting the plurality of connector terminals into the plurality of terminal accommodating chambers while holding the plurality of electric wires individually. This means that the terminal insertion device according to the present invention allows the connector terminals to be inserted into the terminal accommodating chambers in the connector housing, the connector terminals being connected to ends of the respective electric wires in the multi-core cable by crimping, while reducing the separation length for the plurality of electric wires.

Furthermore, the terminal insertion device according to the present invention is configured so that the insertion into the plurality of terminal accommodating chambers is performed while the plurality of connector terminal are held so as to hold the tips of the plurality of connector terminals, allocated to the inlets of the plurality of terminal accommodating chambers in a one-to-one manner. First, instead of the electric wires, the connector terminals themselves are held, which can prevent situations such as unsteadiness of a position of the connector terminals e.g. due to bending an electric wire near the connector terminal during insertion. Moreover, the terminal separator is used to hold the connector terminals so that the tips of the plurality of connector terminals are allocated to the inlets of the plurality of terminal accommodating chambers in a one-to-one manner. This enables a simultaneous insertion with high certainty.

DETAILED DESCRIPTION OF THE PREFERRED EMBODIMENTS

In the following description, a terminal insertion device according to a first embodiment of the present invention will be described.

Figure 1:
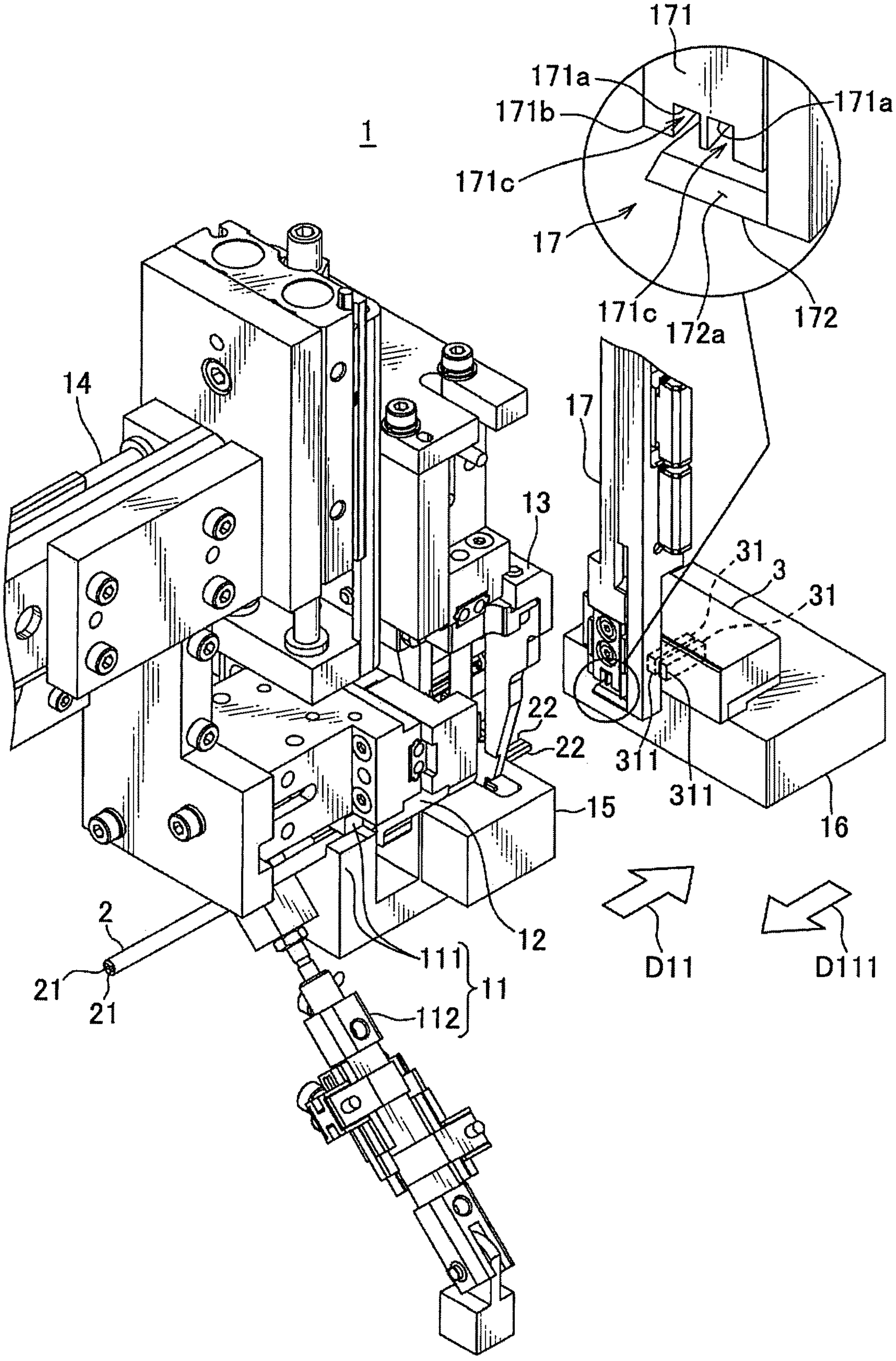
FIG. 1. shows a terminal insertion device according to a first embodiment of the present invention.

FIG. 1 shows a terminal insertion device according to the first embodiment of the present invention.

The terminal insertion device 1 according to the present embodiment is configured to insert two connector terminals 22 into two terminal accommodating chambers 31 arranged in parallel to each other in a connector housing 3, each of the connector terminals 22 being connected by crimping to each end of two electric wires 21 of a shielded cable 2 for high frequency as an example for a multi-core cable.

The terminal insertion device 1 includes a cable holder 11 for holding the shielded cable 2. The cable holder 11 includes a holding mechanism 111 for gripping the shielded cable 2, and an actuation cylinder 112 for actuating the holding mechanism 111. Further, the terminal insertion device 1 includes a cable chuck 12 and a terminal chuck 13 which are arranged from the side of the cable holder 11 in an insertion direction D11 into the terminal accommodating chambers 31 for the connector terminals 22.

The cable chuck 12 and the terminal chuck 13 are mechanisms configured to hold the shielded cable 2 and the two connector terminals 22 at its tip and to move them in the insertion direction D11, respectively. A first moving mechanism 14 is provided in the terminal insertion device 1 for moving the above described mechanisms in the insertion direction D11. The cable holder 11 as mentioned above is configured to hold the shielded cable 2 until the cable chuck 12 and the terminal chuck 13 complete holding, wherein during the movement, the cable holder 11 is retracted downward in the Figure. Further, a terminal support 15 is provided in the terminal insertion device 1 for supporting the connector terminals 22 from below until the terminal chuck 13 completes holding them. Similarly, the terminal support 15 is retracted downward together with the cable holder 11 during the movement of the cable chuck 12 and the terminal chuck 13 by the first moving mechanism 14.

The connector housing 3 is held on a forward side of the cable chuck 12 and the terminal chuck 13 in the insertion direction D11. In the terminal insertion device 1, this connector housing 3 is held by a second moving mechanism 16 which is configured to move the connector housing 3 in an opposite direction D111 which is opposite to the insertion direction D11.

Additionally, a terminal guide 17 is arranged in the terminal insertion device 1, spaced with a predetermined distance from the connector housing 3, on a forward side of an initial position before movement of the connector housing 3 held by the second moving mechanism 16 in the opposite direction D111 mentioned above.

The terminal guide 17 is located closer to the connector housing 3 than the terminal chuck 13 in the insertion direction D11 when the cable chuck 12 and the terminal chuck 13 are moved by the first moving mechanism 14, i.e. when moving the two connector terminals 22. And the terminal guide 17 guides the tips of the two connector terminals 22 by allocating the tips to inlets 311 of the two terminal accommodating chambers 31 in a one-to-one manner. The terminal guide 17 includes a guide plate 171 and a lid element 172.

The guide plate 171 extends in a plate shape along an intersecting plane intersecting the insertion direction D11, wherein the guide plate 171 has two receiving grooves **171*a* which are formed from an end edge 171*b* and configured to receive the two connector terminals 22 when the two connector terminals 22 are moved in the insertion direction D11. The two receiving grooves 171*a* receive the two connector terminals 22 so that the tips of the connector terminals 22 project out in a one-to-one manner into the inlets 311 of the two terminal accommodating chambers 31 from a side of the guide plate 171 facing the connector housing 3**.

The lid element 172 comes into contact with the end edge 171*b* of the guide plate 171 so as to cover the two receiving grooves 171*a* with the two connector terminals 22 received thereinto. By covering the two receiving grooves 171*a* by this lid element 172, two through holes 171*c* are formed in the terminal guide 17 which guide the two connector terminals 22 therethrough respectively in the insertion direction D11 to the inlets 311 of the two terminal accommodating chambers 31. Further, according to the present embodiment, a part of the lid element 172 which is located at a contact surface with the end edge 171*b* of the guide plate 171 and on a side of the terminal chuck 13 forms an oblique surface 172*a* tilted downward in the Figure in an opposite direction to the insertion direction D11, i.e. toward the inlet side of the through holes 171*c*. With the oblique surface 172*a*, the tip of each of the connector terminals 22 can be guided well into each of the through holes 171*c* when the two connector terminals 22 are received by the two receiving grooves 171*a*. According to the present embodiment, the lid element 172 is formed in an L-shape having a column-like section extending in a vertical direction, wherein a tip of the column-like section is bent so as to come into contact with the end edge 171*b* of the guide plate 171.

Moreover, the guide plate 171 according to the present embodiment is movable in the vertical direction in the Figure along the column-like section of the lid element 172. In an initial phase of receiving the connector terminals 22 into the receiving grooves 171*a*, the guide plate 171 is lifted slightly so that the connector terminals 22 can be more easily received. When the connector terminals 22 have traveled to a certain extent into the receiving grooves 171*a*, the guide plate 171 is lowered so that the end edge 171*b* comes into contact with the lid element 172 and the through holes 171*c* are thereby formed.

For the terminal insertion device 1 according to the present embodiment, first, the cable chuck 12 and the terminal chuck 13 hold the shielded cable 2 and the two connector terminals 22 at its tip respectively, and are moved by the first moving mechanism 14 in the insertion direction D11. The tips of the connector terminals 22 travel through the respective through holes 171*c* of the terminal guide 17, wherein the cable chuck 12 and terminal chuck 13 are stopped when the tips have traveled until they project out at the side of the connector housing 3. Next, the connector housing 3 is moved by the second moving mechanism 16 in the opposite direction D111 opposite to the insertion direction D11 until the tips of the connector terminals 22 projecting out of the terminal guide 17 have entered the respective inlets 311 of the terminal accommodating chambers 31. When the tips of the connector terminals 22 have entered the respective inlets 311 of the terminal accommodating chambers 31, the guide plate 171 and the lid element 172 of the terminal guide 17 are separated upward and downward and retracted to positions which do not interfere. Finally, the cable chuck 12 and the terminal chuck 13 are moved again in the insertion direction D11 by the first moving mechanism 14 so that the connector terminals 22 are inserted into the respective terminal accommodating chambers 31 until completely accommodated therein.

Hereinafter, each of phases of the above mentioned terminal insertion operation in the terminal insertion device 1 will be described in details by using other Figures.

Figure 2:
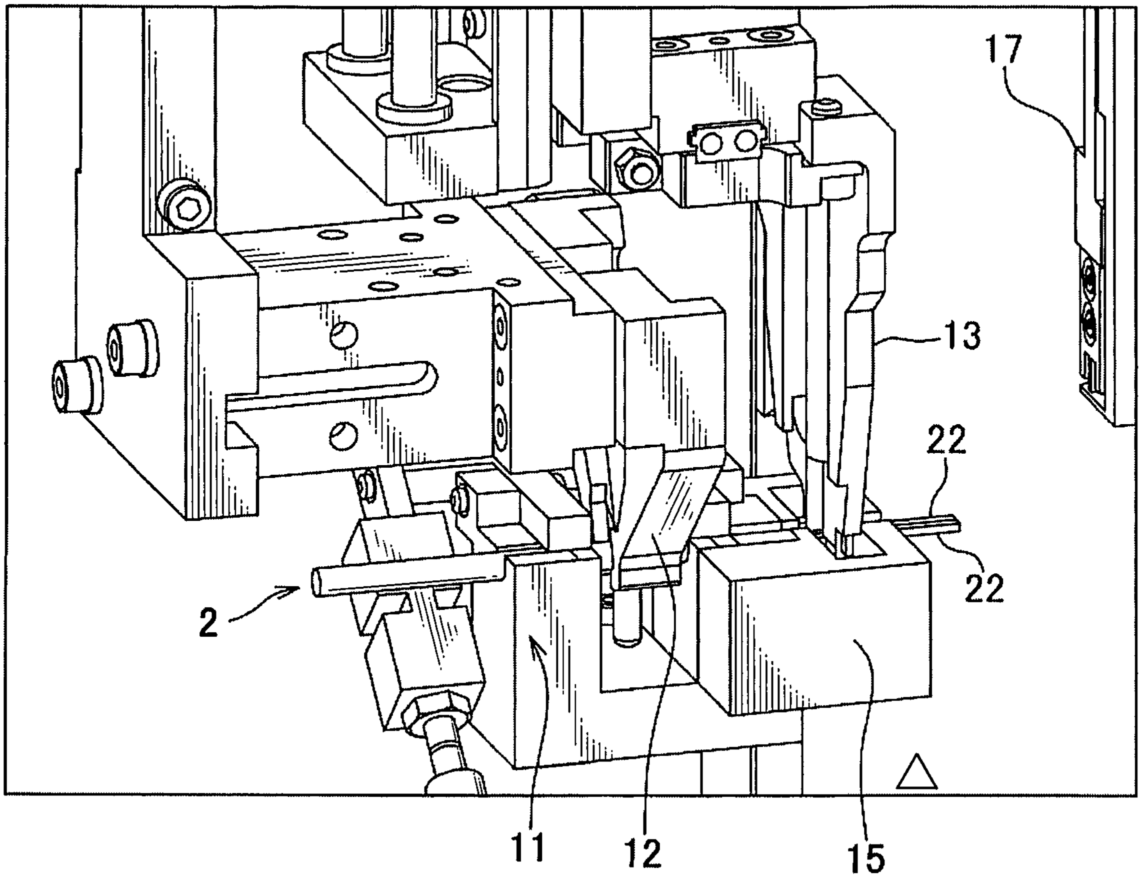
FIG. 2. shows an initial phase in which a cable chuck and a terminal chuck in the terminal insertion device according to FIG. 1 hold a shielded cable and two connector terminals.

FIG. 2 shows an initial phase in which the cable chuck and the terminal chuck in the terminal insertion device according to FIG. 1 hold the shielded cable and two connector terminals.

The initial phase is performed as described above with the shielded cable 2 being held by the cable holder 11 and with the connector terminals 22 being held by the terminal support 15. In this state, the cable chuck 12 and the terminal chuck 13 hold the shielded cable 2 and the two connector terminals 22. Further, in the initial phase, the terminal guide 17 is located in a retracted position spaced from a travel path for the connector terminals 22.

Figure 3:
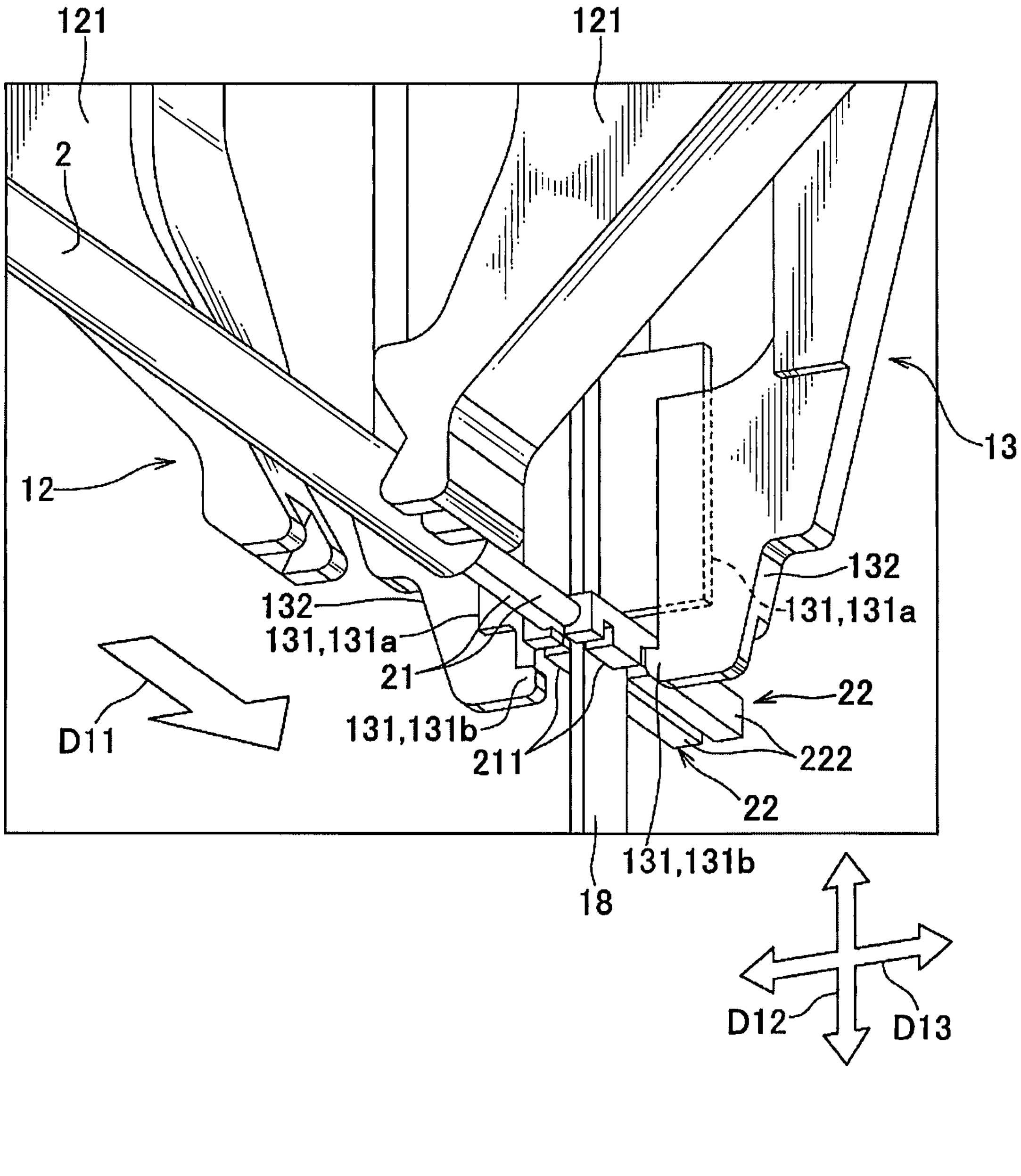
FIG. 3. shows how the cable chuck and the terminal chuck according to FIG. 2 hold the shielded cable and the two connector terminals.

FIG. 3 shows how the cable chuck and the terminal chuck according to FIG. 2 hold the shielded cable and the two connector terminals. In the FIG. 3, illustration of the cable holder 11 and the terminal support 15 is omitted in order to easier recognize how the cable chuck 12 and the terminal chuck 13 are held.

The cable chuck 12 clamps the shielded cable 2 with a pair of chuck portions 121. On the other hand, the terminal chuck 13 clamps and bundles the two connector terminals 22 in two directions, wherein one of the two directions is a first direction D12 intersecting the insertion direction D11 and another of the two directions is a second direction D13 intersecting the insertion direction D11 as well as the first direction D12. According to the present embodiment, the first direction D12 extends in the vertical direction in the Figure, and the second direction D13 extends in a lateral direction in the Figure.

The terminal chuck 13 includes a pair of first chuck portions 131 and a pair of second chuck portions 132, wherein the pair of first chuck portions 131 clamps the two connector terminals 22 in the first direction D12 and the pair of second chuck portions 132 clamps the two connector terminals 22 in the second direction D13.

Here, according to the present embodiment, the terminal insertion device 1 includes a terminal separator 18 to be interposed between the two connector terminals 22. When the two connector terminals 22 are bundled by the terminal chuck 13 so as to extend along the insertion direction D11, the terminal separator 18 allocates the tips of the two connector terminals 22 to respective inlets 311 of the two terminal accommodating chambers 31 in a one-to-one manner. According to the present embodiment, the terminal separator 18 is a ribbon-shaped plate element extending in the first direction D12 along the insertion direction D11 as well as the first direction D12.

Further, according to the present embodiment, upper portions 131*a* of the pair of the first chuck portions 131 shown at the upper side in the Figure are provided at the terminal separator 18. The upper portion 131*a* is a rectangular-plate-shaped portion which is orthogonal to the terminal separator 18 in the second direction in the middle of the terminal separator 18 in a width direction and extends in the first direction D12. The upper portion 131*a* is formed integrally with the terminal separator 18 and movable together with the terminal separator 18 in the first direction D12.

Further, according to the present embodiment, lower portions 131*b* of the pair of first chuck portions 131 shown at the lower side in the Figure are portions extending in a hook-like shape out of respective tips of the pair of second chuck portions 132 so as to face the upper portions 131*a*.

For the terminal chuck 13, the two connector terminals 22 are clamped in two directions to be bundled by bringing the pair of second chuck portions 132 close to each other and by lowering the upper portions 131*a* of the pair of first chuck portions 131 together with the terminal separator 18.

Here, each of the connector terminals 22 includes a crimped portion 221 to be crimped to the end of the electric wire 21, and a mated portion 222 with which partner terminals are mated. The terminal chuck 13 clamps the respective crimped portions 221 of the two connector terminals 22 together.

Once holding the shielded cable 2 and the two connector terminals 22 by the cable chuck 12 and the terminal chuck 13 has been completed, in the next phase, the following operation is performed in the terminal insertion device 1.

Figure 4:
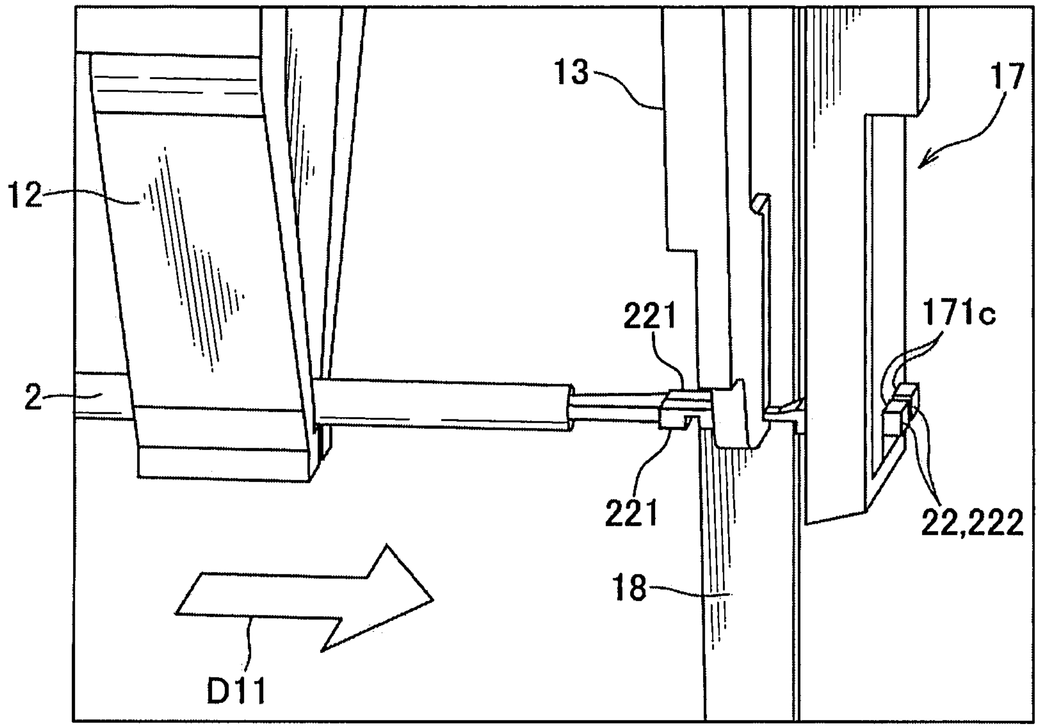
FIG. 4. shows an operation in a following phase of holding the shielded cable and the two connector terminals by means of the cable chuck and the terminal chuck.

FIG. 4 shows an operation in a following phase of holding the shielded cable and the two connector terminals by means of the cable chuck and the terminal chuck.

In this next phase of holding the shielded cable 2 and the two connector terminals 22, first, the cable holder 11 and the terminal support 15 as shown in FIG. 1 are retracted downward. Then, the first moving mechanism 14 moves the cable chuck 12 and the terminal chuck 13, i.e. the two connector terminals 22, in the insertion direction D11. At this time, the terminal separator 18 is also moved together with the terminal chuck 13 as a unit.

At this time, the terminal guide 17 which was retracted as shown in FIG. 2, is moved to a position at which the inlets 311 of the two terminal accommodating chambers 31 in the connector housing 3 (not shown in FIG. 5) are allocated to the two through holes 171*c* in the terminal guide 17 in a one-to-one manner. Then, the movement of the connector terminals 22 by the first moving mechanism 14 is continued until the mated portions 222 of the connector terminals 22 travel through the through holes 171*c* of such a terminal guide 17 respectively and the respective tips project out of the terminal guide 17 slightly.

Figure 5:
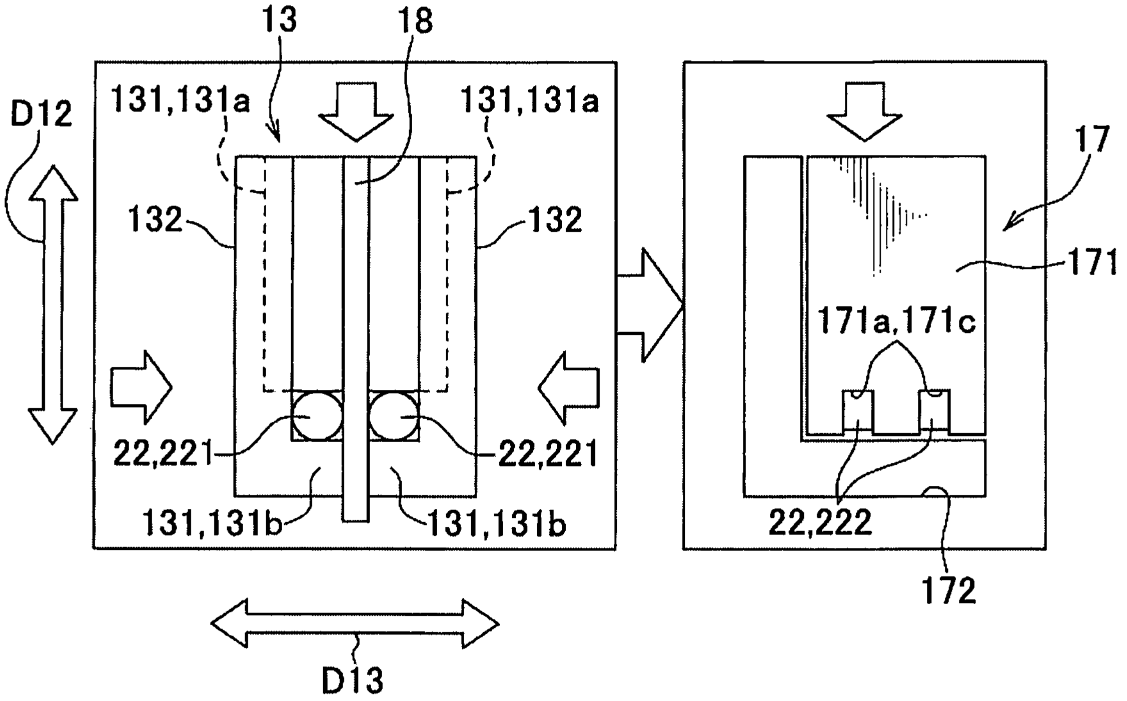
FIG. 5. is a schematic diagram illustrating a held state of the connector terminals in a phase where mated portions of the connector terminals have been introduced through through holes of a terminal guide as shown in FIG. 4.

FIG. 5 is a schematic diagram illustrating a held state of the connector terminals in a phase where mated portions of the connector terminals have been introduced through through holes of a terminal guide as shown in FIG. 4.

First, the crimped portions 221 of the two connector terminals 22 are clamped and bundled by the terminal chuck 13 in two directions, i.e. in the first direction D12 and in the second direction D13, with the terminal separator 18 being interposed between the crimped portions 221. As described above, with regard to the first direction D12, the crimped portions 221 are clamped by the pair of first chuck portions 131 comprised of the lower portions 131*b* and the upper portions 131*a* lowered together with the terminal separator 18. Further, with regard to the second direction D13, the crimped portions 221 are clamped by the pair of second chuck portions 132. Additionally, the mated portions 222 of the two connector terminals 22 is introduced through the two through holes 171*c* which are formed by covering the receiving grooves 171*a* of the guide plate 171 with the lid element 172.

Figure 6:
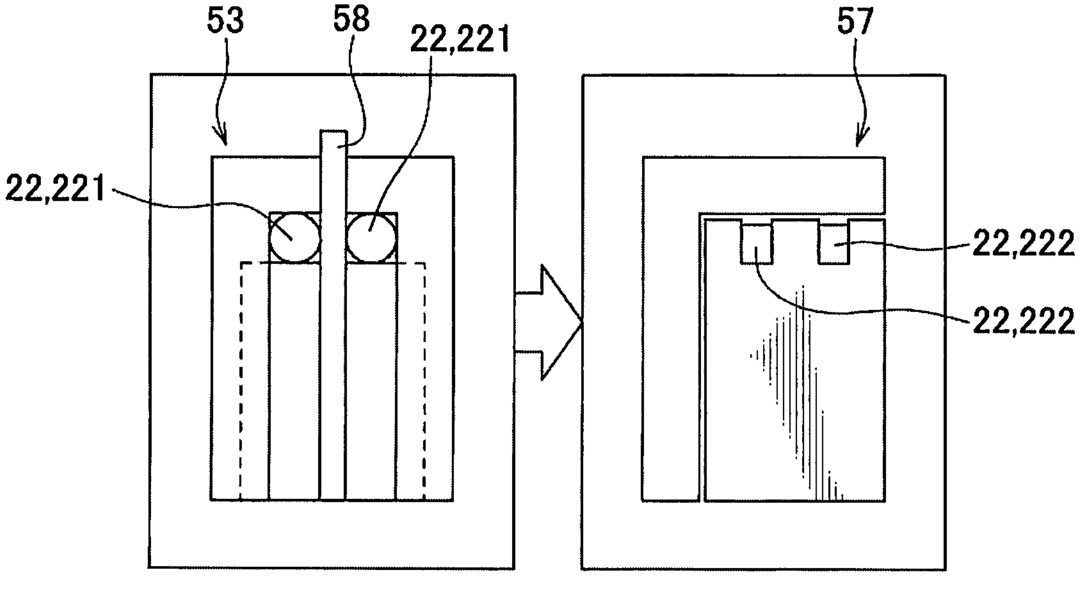
FIG. 6. is a schematic diagram illustrating an exemplar variation for the held state of the connector terminals according to the first embodiment as shown in FIG. 5.

FIG. 6 is a schematic diagram illustrating an exemplar variation for the held state of the connector terminals according to the first embodiment as shown in FIG. 5.

While the connector terminals 22 according to the first embodiment as shown in FIG. 5 are held by access from above at the terminal insertion device 1 shown in FIG. 1, the connector terminals 22 according to the present exemplar variation are held in a direction opposite to the first embodiment, i.e. from below. Accordingly, the terminal chuck 43, the terminal guide 47 and the terminal separator 48 according to the exemplar variation are arranged in an orientation vertically inversed to the first embodiment as described above. On the other hand, each of the elements has the same shape etc. as in the first embodiment. With the present variation, the connector terminals 22 can be held in a similar manner to the first embodiment as shown in FIG. 5.

Here, the description of the exemplar variation shall be concluded, and it will return to the description of operation in the terminal insertion device 1 according to the first embodiment.

As shown in FIGS. 4 and 5, once the connector terminals 22 have been moved to a state where their tips slightly project out of the terminal guide 17, in the next phase, the connector housing 3 is moved by the second moving mechanism 16 shown in FIG. 1, with the connector terminals 22 being stopped.

Figure 7:
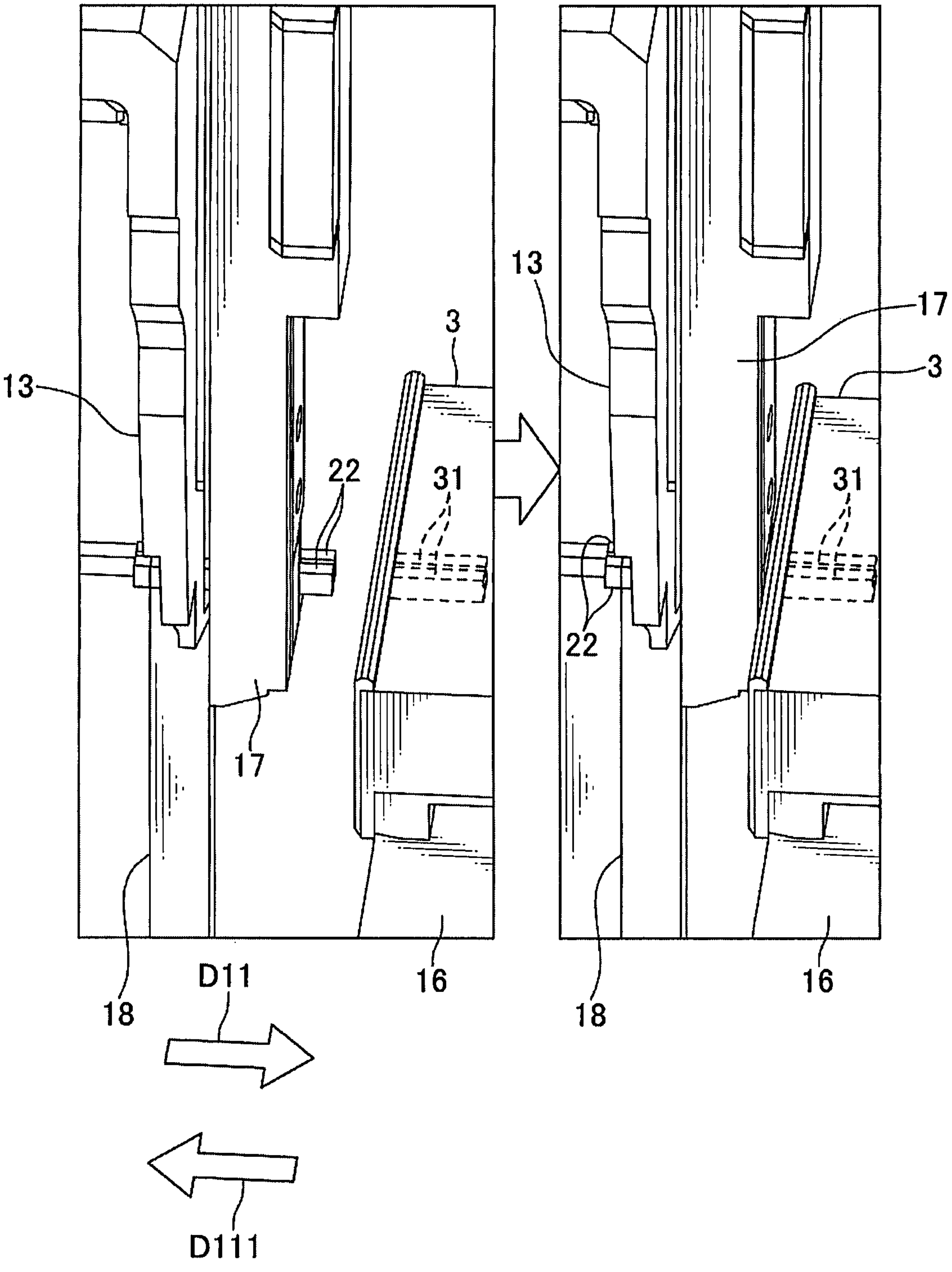
FIG. 7. shows how a connector housing is moved in the terminal insertion device according to FIG. 1 with the connector terminals being stopped.

FIG. 7 shows how a connector housing is moved in the terminal insertion device according to FIG. 1 with the connector terminals being stopped.

First, movement of the connector housing 3 by the second moving mechanism 16 is performed in the opposite direction D111 which is opposite to the insertion direction D11 for the connector terminals 22. During the movement, the cable chuck 12, the terminal chuck 13, the terminal guide 17 and the terminal separator 18 are in a stopped state. In this state, the second moving mechanism 16 moves the connector housing 3 in the opposite direction D111 as described above until it comes into contact with the terminal guide 17, out of which the tips of the connector terminals 22 project slightly.

At this time, the terminal guide 17 is located so that the through holes 171*c* are allocated to the inlets 311 of the two terminal accommodating chambers 31 of the connector housing 3 in a one-to-one manner, as described above. Accordingly, the tips of the two connector terminals 22 which are introduced through and project out of the through holes 171*c* of the terminal guide 17 are located so that they are allocated to the inlets 311 of the two terminal accommodating chambers 31 in a one-to-one manner. In this manner, when the connector housing 3 is moved as described above, a part of the tips of the connector terminals 22 projecting out of the terminal guide 17 enters the terminal accommodating chambers 31 through their inlets 311.

Figure 8:
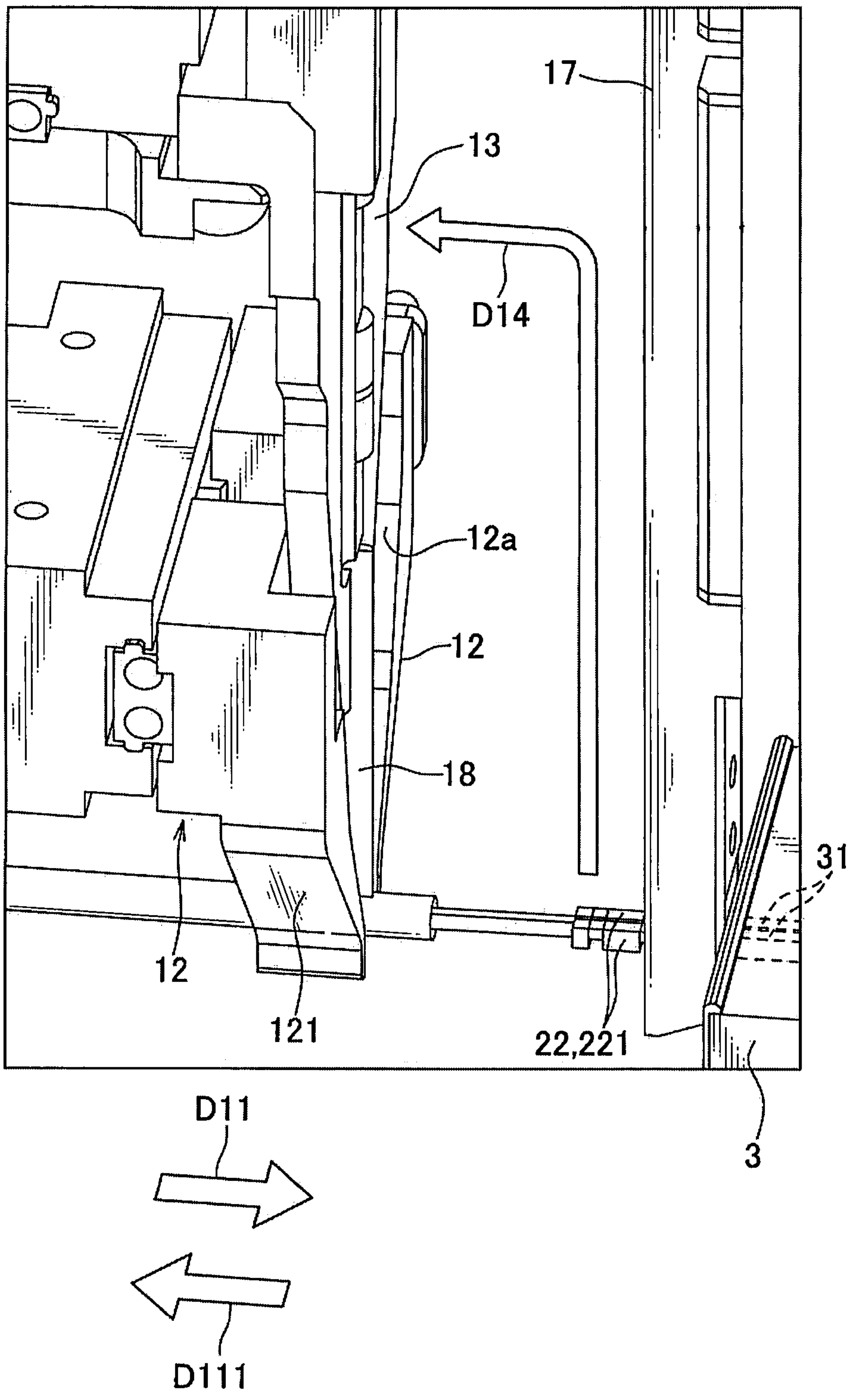
FIG. 8. shows an operation in the terminal insertion device according to FIG. 1 which is performed after a part of the tips of the connector terminals has entered the terminal accommodating chambers through their inlets by the movement of the connector housing.

FIG. 8 shows an operation in the terminal insertion device according to FIG. 1 which is performed after a part of the tips of the connector terminals has entered the terminal accommodating chambers through their inlets by the movement of the connector housing.

When the connector housing 3 is moved until it comes into contact with the terminal guide 17, wherein a part of the tips of the connector terminals 22 has then entered the terminal accommodating chambers 31 through their inlets, the connector housing 3 is stopped. Accordingly, retraction movement of the terminal chuck 13 and the terminal separator 18 is performed to get ready for movement of the connector terminals 22 as described below.

The terminal chuck 13 first releases the connector terminals 22 by opening the above-described clamping in the two directions. Then, the terminal chuck 13 is lifted together with the terminal separator 18 as shown with an arrow D14, and moved in the opposite direction D111 which is opposite to the insertion direction D11. Here, according to the present embodiment, an accommodating space 12*a* for the terminal chuck 13 and the terminal separator 18 is formed between the pair of chuck portions 121 which form the cable chuck 12. The terminal chuck 13 and the terminal separator 18 which have been moved in the direction of the arrow D14 direction is accommodated in the accommodating space 12*a*.

Following the retraction movement of the terminal chuck 13 and the terminal separator 18, retraction movement of the terminal guide 17 is performed.

Figure 9:
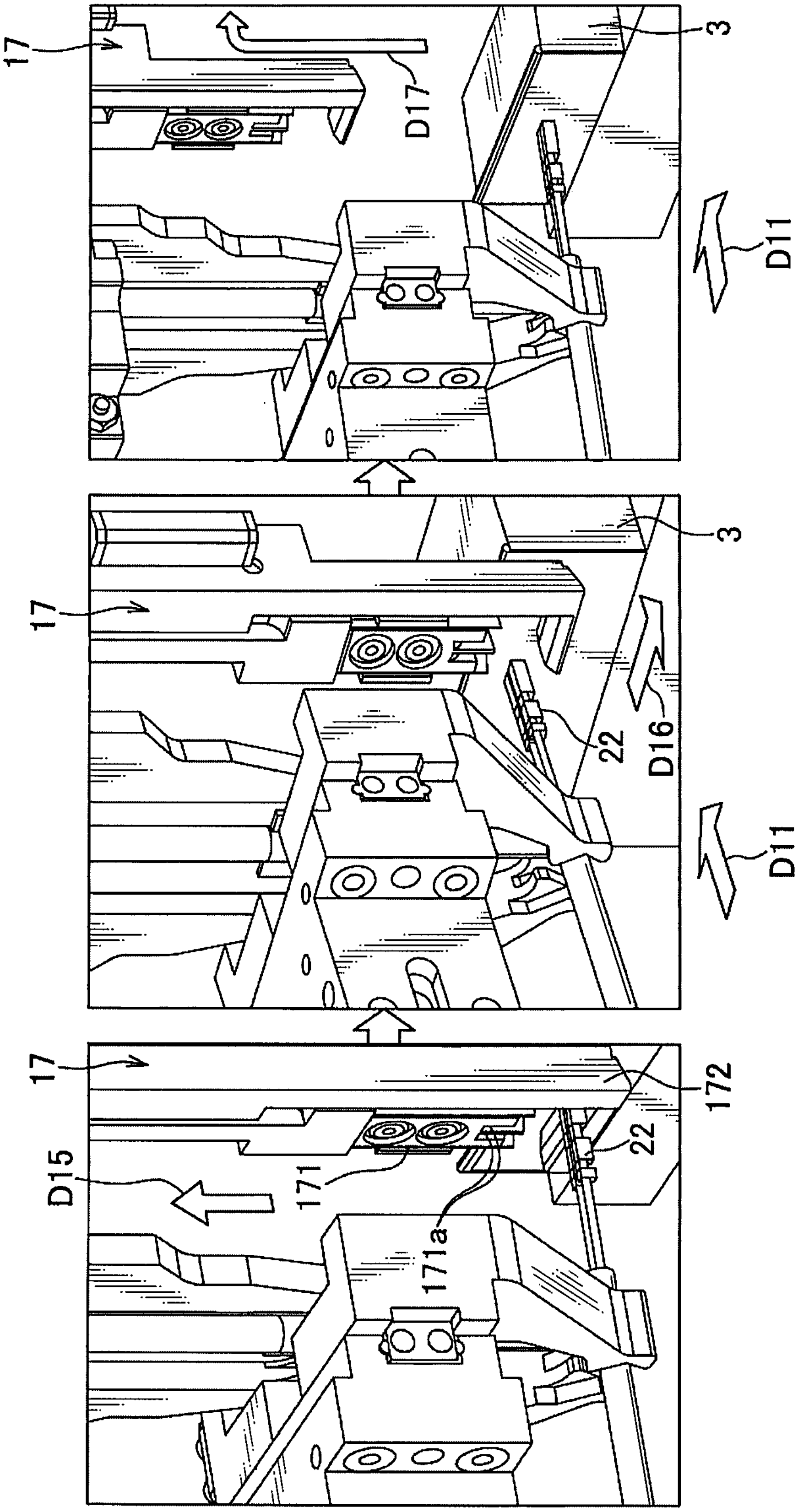
FIG. 9. shows how retraction movement of the terminal guide is performed.

FIG. 9 shows how retraction movement of the terminal guide is performed.

In the retraction movement of the terminal guide 17, the guide plate 171 is first lifted in a direction of arrow D15 and moved away from the lid element 172. At this time, the two connector terminals 22 leave the receiving grooves 171*a* in the guide plate 171. Then, the terminal guide 17 is moved in a direction of arrow D16 orthogonal to the insertion direction D11, with the guide plate 171 remaining lifted. With this movement, the two connector terminals 22 are released from the terminal guide 17. At this time, a part of the tips of the connector terminals 22 have entered the terminal accommodating chambers 31 in the connector housing 3. The terminal guide 17 which has released the connector terminals 22 is further lifted as shown with an arrow D17, and moved in the insertion direction D11 to a retracted position (not shown).

Once the retraction movement of the terminal guide 17 has been ended, a final operation of insertion for the connector terminals 22 is initiated.

Figure 10:
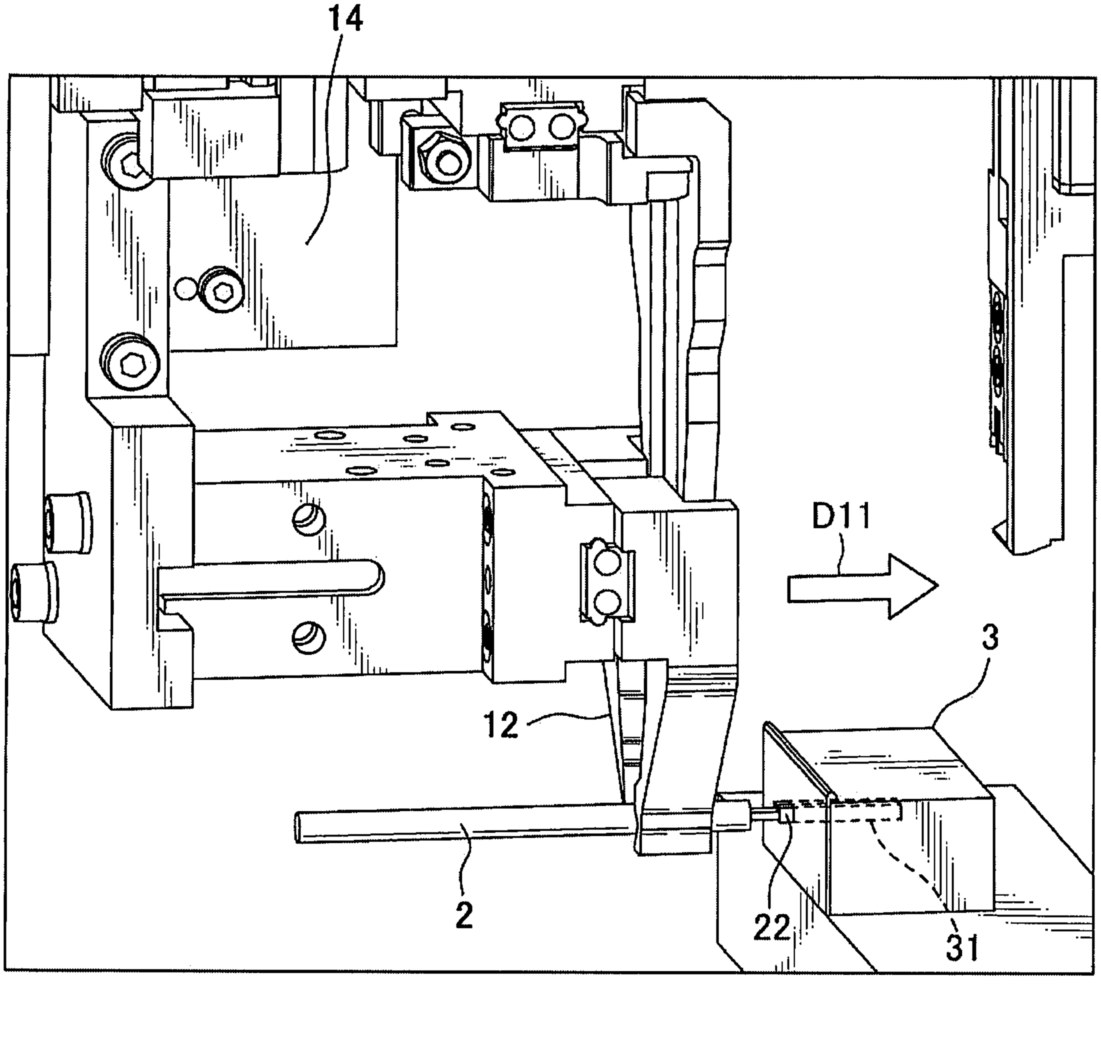
FIG. 10. shows how a final operation of the insertion for the connector terminals is performed.

FIG. 10 shows how the final operation of the insertion for the connector terminals is performed.

In this final operation, the connector terminals 22 for which a part of their tips has entered the terminal accommodating chambers 31 in the connector housing 3, is forced into the terminal accommodating chambers 31 to a final accommodation depth. This final operation is performed by moving the cable chuck 12 with the first moving mechanism 14 in the insertion direction D11, with the cable chuck 12 holding the shielded cable 2. With this final operation, the terminal insertion operation in the terminal insertion device 1 as shown in FIG. 1 is ended.

With the terminal insertion device 1 according to the first embodiment and its exemplar variation as described above, the two connector terminals 22 are bundled by clamping them with the terminal chuck 13 in two directions and inserted together into the two terminal accommodating chambers 31 in the connector housing 3. In this case, the two electric wires 21 in the shielded cable 2 are not held individually near the connector terminals 22. Therefore, it is sufficient to separate the two electric wires 21 so that the tips of the two connector terminals 22 can be arranged allocated to the inlets 311 of the two terminal accommodating chambers 31 in a one-to-one manner. Thus, the present embodiment and the exemplar variation enable the separation length of the two electric wires 21 to be reduced as compared to insertion of the two connector terminals 22 into the two terminal accommodating chambers 31 by holding the two electric wires 21 individually. That means, with the present embodiment and the exemplar variation, the connector terminals 22 which are connected to the respective ends of the electric wires 21 by crimping can be inserted into the terminal accommodating chambers 31 in the connector housing 3 while reducing the separation length of the two electric wires 21 in the shielded cable 2 as a multi-core cable.

Further, according to the present embodiment and the exemplar variation, the connector terminals 22 are inserted into the two terminal accommodating chambers 31, while the two connector terminals 22 are held so as to allocate the tips of the two connector terminals 22 to the inlets 311 of the two terminal accommodating chambers 31 in a one-to-one manner. First, instead of the electric wires 21, the connector terminals 22 themselves are held. This can prevent situations such as unsteadiness of a position of the connector terminals 22 e.g. due to bending an electric wire 21 near the connector terminal 22 during insertion. Additionally, the terminal separator 18 is used to hold the connector terminals 22 so that the tips of the two connector terminals 22 are allocated to the inlets 311 of the two terminal accommodating chambers 31 in a one-to-one manner. This enables a simultaneous insertion with high certainty.

Further, according to the present embodiment, the terminal separator 18 is responsible for holding the upper portions 131*a* of the pair of first chuck portions 131 constituting the terminal chuck 13. This can enable a corresponding amount of simplification of the structure in the terminal insertion device 1 accordingly.

Furthermore, according to the present embodiment and its exemplar variation, the second chuck portions 132 are responsible for holding the lower portions 131*b* of the pair of first chuck portions 131. This can also enable a corresponding amount of simplification of the structure in the terminal insertion device 1.

Moreover, according to the present embodiment and the exemplar variation, the terminal guide 17 is provided which is located closer to the connector housing 3 than the terminal chuck 13 and configured to guide the tips of the two connector terminals 22 by allocating them to the inlets 311 of the two terminal accommodating chambers 31 in a one-to-one manner. This guidance by the terminal guide 17 can further increase the certainty for insertion of the connector terminals 22.

Furthermore, according to the present embodiment and the exemplar variation, the terminal guide 17 includes two through holes 171*c* which introduce the respective mated portions 222 of the two connector terminals 22 therethrough in the insertion direction D11 and guide them to the inlets 311 of the two terminal accommodating chambers 31. According to this terminal insertion device 1, the crimped portions 221 of the connector terminals 22 are held by the terminal chuck 13, and the mated portions 222 of the connector terminals 22 are guided with the through holes 171*c* in the terminal guide 17. In this manner, the connector terminals 22 can be held by the terminal chuck 13 better while reducing external forces applied to the mated portions 222 which may affect mating characteristics of the connector terminals 22 with regard to partner terminals.

Further, according to the present embodiment and the exemplar variation, the terminal guide 17 includes the guide plate 171 with two receiving grooves 171*a* formed from the end edge 171*b*, and the lid element 172, wherein the receiving grooves 171*a* are configured to receive the two connector terminals 22, and the lid element 172 is configured to come into contact with the end edge 171*b* so as to cover the two receiving grooves 171*a*. In this manner, the terminal guide 17 can be divided into the guide plate 171 and the lid element 172. Accordingly, this can facilitate introduction of the connector terminals 22 into the receiving grooves 171*a*, and retraction of the terminal guide 17 from the connector terminals 22 at appropriate timing during terminal insertion etc. Thus, terminal insertion operation in the terminal insertion device 1 can be performed smoothly.

Next, a terminal insertion device according to a second embodiment of the present invention will be described. According to the second embodiment, in contrary to the above-described first embodiment, the shielded cable to be processed is configured as a four-core cable. Accordingly, four connector terminals are to be inserted, upon which the terminal chuck, the terminal separator and the terminal guide differ from those according to the first embodiment in their individual configurations. On the other hand, the second embodiment has the substantially same basic configuration and operation of the terminal insertion device as the first embodiment. Therefore, the following description is focused on differences between the second embodiment and the first embodiment, wherein illustration and description of identical matters shall be omitted.

Figure 11:
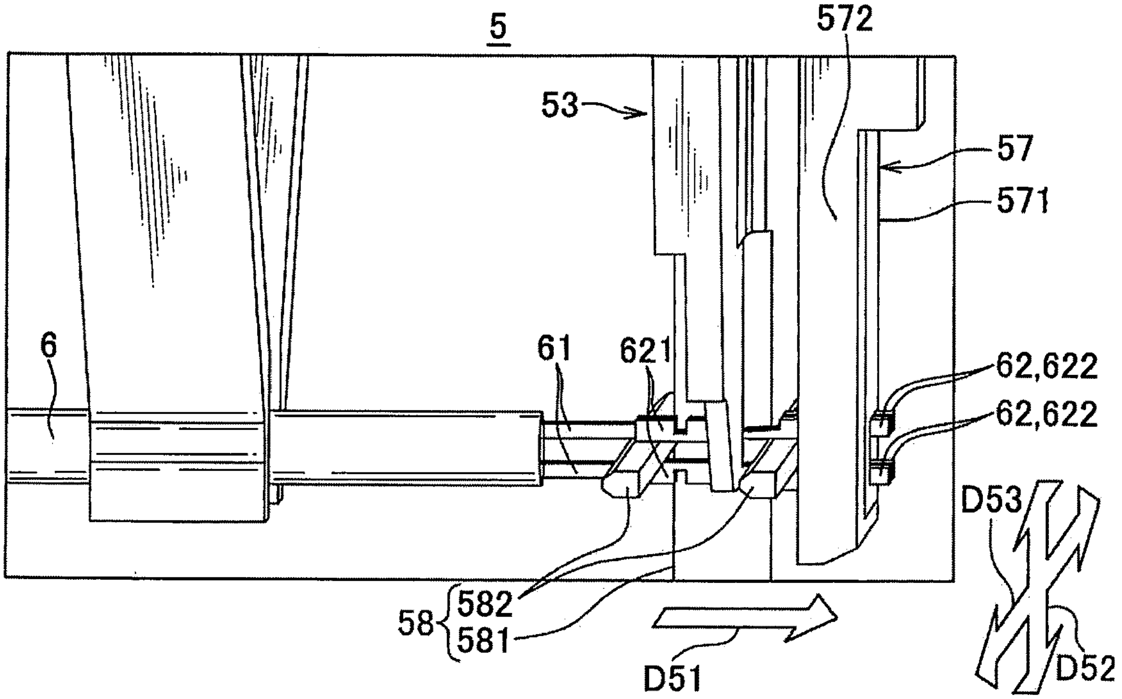
FIG. 11. shows a terminal insertion device according to a second embodiment of the present invention focused on a terminal chuck and a terminal guide.
Figure 12:
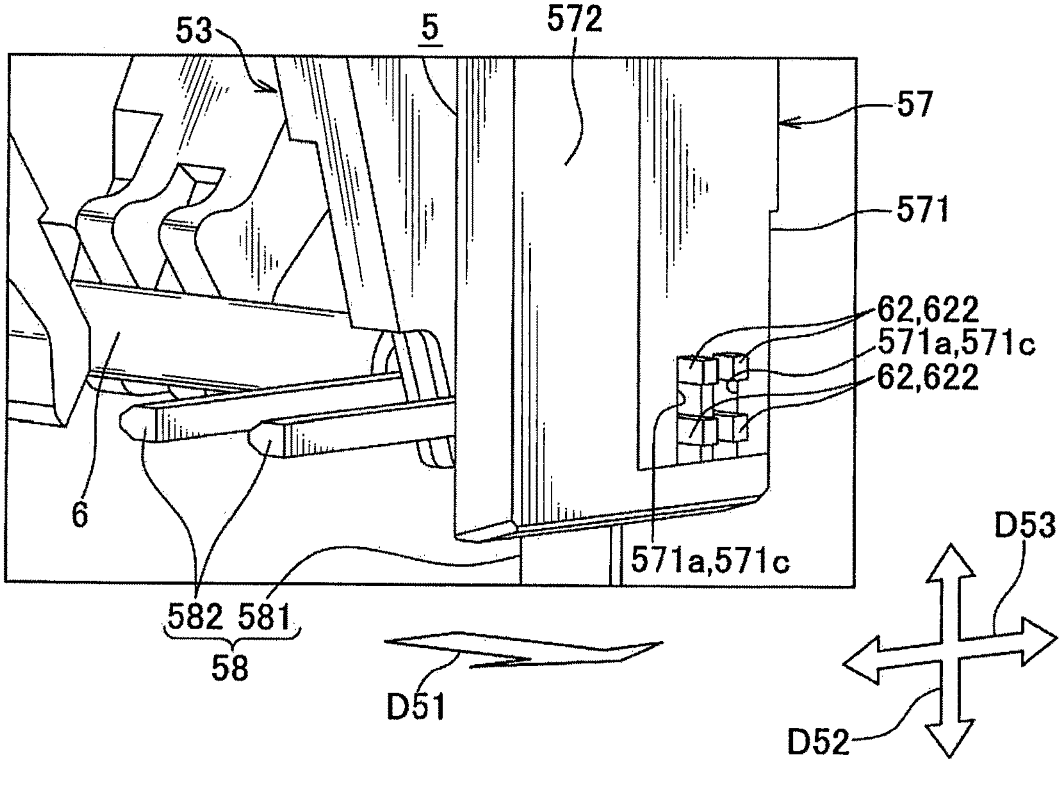
FIG. 12. shows the terminal chuck and the terminal guide according to FIG. 11 as seen from a forward side in an insertion direction of connector terminals.

FIG. 11 shows a terminal insertion device according to a second embodiment of the present invention focused on a terminal chuck and a terminal guide. Further, FIG. 12 shows the terminal chuck and the terminal guide according to FIG. 11 as seen from a forward side in an insertion direction of connector terminals.

The terminal insertion device 5 according to the present embodiment is provided so that four connector terminals 62 are inserted into four terminal accommodating chambers arranged in parallel to each other in a not shown connector housing, wherein the connector terminals 62 are connected to respective ends of four electric wires 61 of a four-core shielded cable 6 by crimping, as described above.

Here, according to the present embodiment, the four terminal accommodating chambers into which the insertion is performed are arranged so that inlets of the four terminal accommodating chambers are arranged two-dimensionally in two vertical and horizontal directions, i.e. in a first direction D52 and a second direction D53, in a top view on the connector housing in the insertion direction D51 for the connector terminals 62. The four connector terminals 62 are then bundled by a terminal chuck 53 and a terminal separator 58 and guided by a terminal guide 57 so as to align tips of the connector terminals 62 to the inlets of the four terminal accommodating chambers in a one-to-one manner.

First, according to the present embodiment, the terminal separator 58 includes a first separator element 581 and second separator elements 582. The first separator element 581 is a substantially similar element to the terminal separator 18 according to the first embodiment described above. The first separator element 581 is a single-plate element extending in the first direction D52 which is configured to be interposed between the connector terminals 62. The first separator element 581 divides the four connector terminals 62 in the second direction D53 into two groups each having two connector terminals 62.

The second separator elements 582 are a bar-shaped elements extending in the second direction D53 which are configured to be interposed between the connector terminals 62. The second separator elements 582 divides the four connector terminals 62 in the first direction D52 into two groups each having two connector terminals 62. According to the present embodiment, a pair of second separator elements 582 is arranged upstream and downstream of the terminal chuck 53 in the insertion direction D51.

With the terminal separator 58 including the first separator element 581 and the second separator elements 582, the four connector terminals 62 are divided so as to align their tips to the inlets of four terminal accommodating chambers in a one-to-one manner which are arranged two-dimensionally as described above. The divided four connector terminals 62 are then clamped and bundled by the terminal chuck 53 in two directions, i.e. in the first direction D52 and the second direction D53. The terminal chuck 53 clamps crimped portions 621 of the connector terminals 62 which are crimped to the electric wires 61.

Similarly to the first embodiment, the terminal guide 57 includes a guide plate 571 having two receiving grooves 571*a*, and an L-shaped lid element 572 configured to cover the receiving grooves 571*a*. In the terminal guide 57, the receiving grooves 571*a* are covered by the lid element 572 to form through holes 571*c* which guide the tips of the four connector terminals 62 by allocating them to the inlets of the four terminal accommodating chambers in a one-to-one manner. The receiving grooves 571*a* are formed in a vertically elongate shape so that each of the receiving grooves 571*a* is capable of receiving two connector terminals 62 in the first direction 52. Mated portions 622 of the connector terminals 62 to be mated with partner terminals are introduced through the receiving grooves 571*a*.

Figure 13:
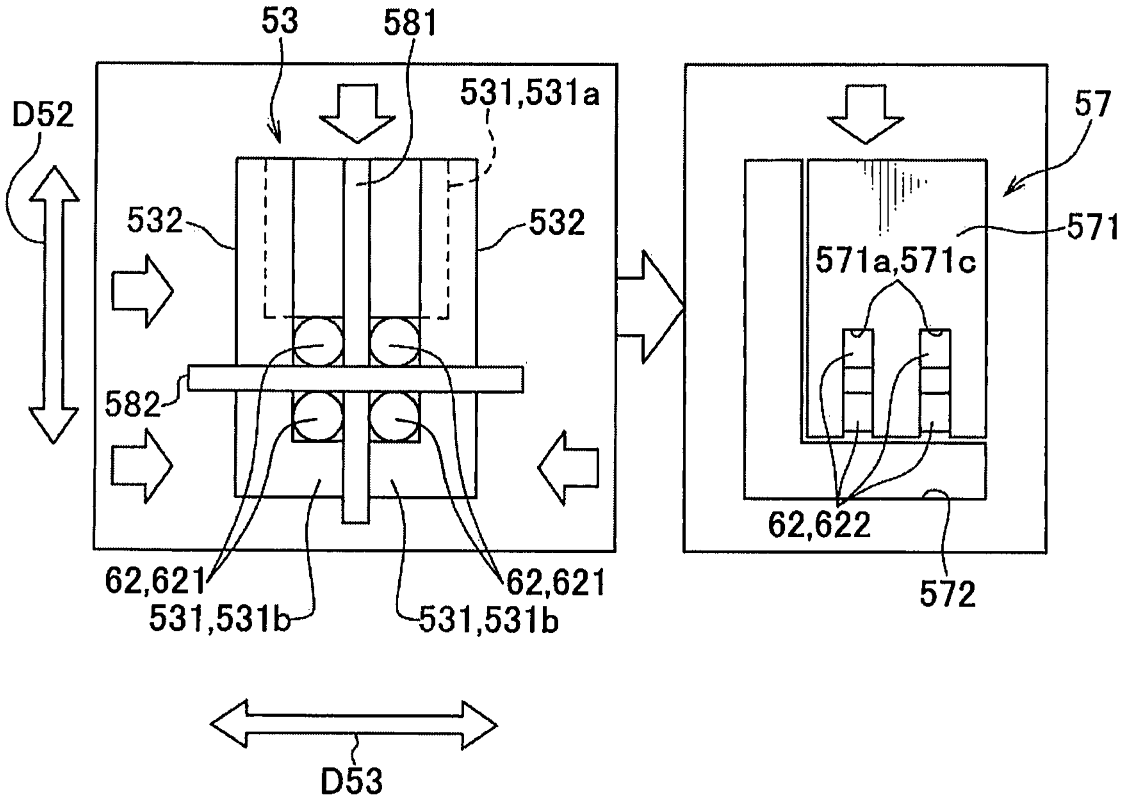
FIG. 13. is a schematic diagram illustrating a held state of connector terminals in a phase where mated portions of the connector terminals have been introduced through through holes of a terminal guide as shown in FIGS. 11 and 12.

FIG. 13 is a schematic diagram illustrating a held state of connector terminals in a phase where the mated portions of the connector terminals have been introduced through the through holes of the terminal guide as shown in FIGS. 11 and 12.

First, the crimped portions 621 of the four connector terminals 62 are clamped and bundled by the terminal chuck 53 in two directions, i.e. in the first direction D52 and in the second direction D53, with the terminal separator 58 being interposed between the crimped portions 621. At this time, one single-plate first separator element 581 is interposed in the first direction D52, while two bar-shaped second separator elements 582 are interposed in the second direction D53.

Similarly to the first embodiment, the terminal chuck 53 includes a pair of first chuck portions 531 and a pair of second chuck portions 532, wherein the pair of first chuck portions 531 clamps the connector terminals 62 in the first direction D52 and the pair of second chuck portions 532 clamps the connector terminals 62 in the second direction D53. Upper portions 531*a* of the first chuck portions 531 are arranged at the first separator element 581, while lower portions 531*b* of the first chuck portions 531 extend in a hook-like shape out of respective tips of the pair of second chuck portions 532 so as to face the upper portions 531*a*. According to the present embodiment, the first separator element 581 is configured to be movable together with the upper portions 531*a* in the first direction D52.

With regard to the first direction D52, the crimped portions 621 are clamped by the pair of first chuck portions 531 comprised of the lower portions 531*b* and the upper portions 531*a* lowered together with the first separator element 581. With regard to the second direction D53, the crimped portions 621 are clamped by the pair of second chuck portions 532. Further, two mated portions 622 of the connector terminals 62 are introduced through each of the two vertically elongate through holes 571*c* which are formed by covering the receiving grooves 571*a* of the guide plate 571 of the terminal guide 57 with the lid element 572.

Figure 14:
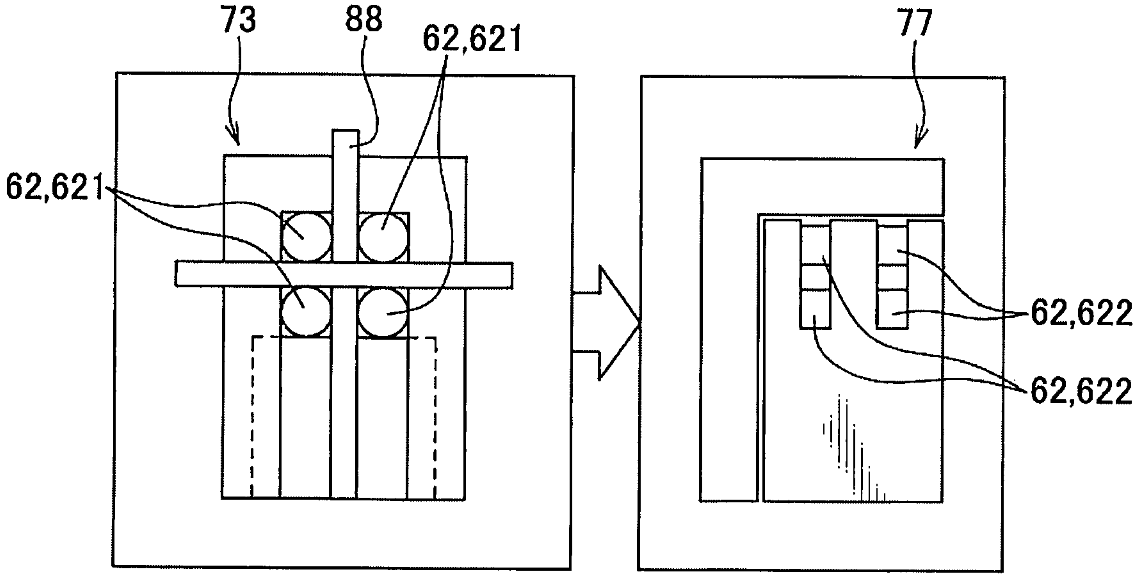
FIG. 14. is a schematic diagram illustrating an exemplar variation for the held state of the connector terminals according to the second embodiment as shown in FIG. 13.

FIG. 14 is a schematic diagram illustrating an exemplar variation for the held state of the connector terminals according to the second embodiment as shown in FIG. 13.

According to the exemplar variation, the terminal chuck 73, the terminal guide 77 and the terminal separator 78 are arranged in an orientation vertically inversed to the first embodiment as described above. With the present variation, the connector terminals 62 can be held in a similar manner to the second embodiment as shown in FIG. 13.

Similarly, it is obvious that the terminal accommodating device 5 according to the second embodiment and its exemplar variation as described above enable insertion of the connector terminals 62 into the terminal accommodating chambers in the connector housing, with the connector terminals 62 being connected to the respective ends of the electric wires 61 by crimping, while reducing the separation length for the four electric wires 61 in the shielded cable 6.

Moreover, according to the present embodiment and its exemplar variation, with the first separator element 581 and the second separator elements 582, the four connector terminals 62 can be bundled better so as to allocate their tips to the inlets of the four terminal accommodating chambers arranged two-dimensionally in a one-to-one manner.

Additionally, the present embodiment and the exemplar variation allow the connector terminals 62 to be held with the terminal chuck 53 while the connector terminals 62 extend better along the insertion direction D51 by arranging the one pair of bar-shaped second separator elements 582 upstream and downstream of the terminal chuck 53 in the insertion direction D51. This can further increase a certainty for insertion of the connector terminals 62.

Next, a terminal insertion device according to a third embodiment of the present invention will be described. The third embodiment is a further exemplar variation of the second embodiment described above, wherein the third embodiment differs from the second embodiment in individual configurations for a terminal chuck and a terminal guide. On the other hand, the third embodiment has the substantially same basic configuration and operation of the terminal insertion device as the first embodiment, similarly to the second embodiment. Therefore, the following description is focused on differences between the third embodiment and the second embodiment, wherein illustration and description of identical matters shall be omitted.

Figure 15:
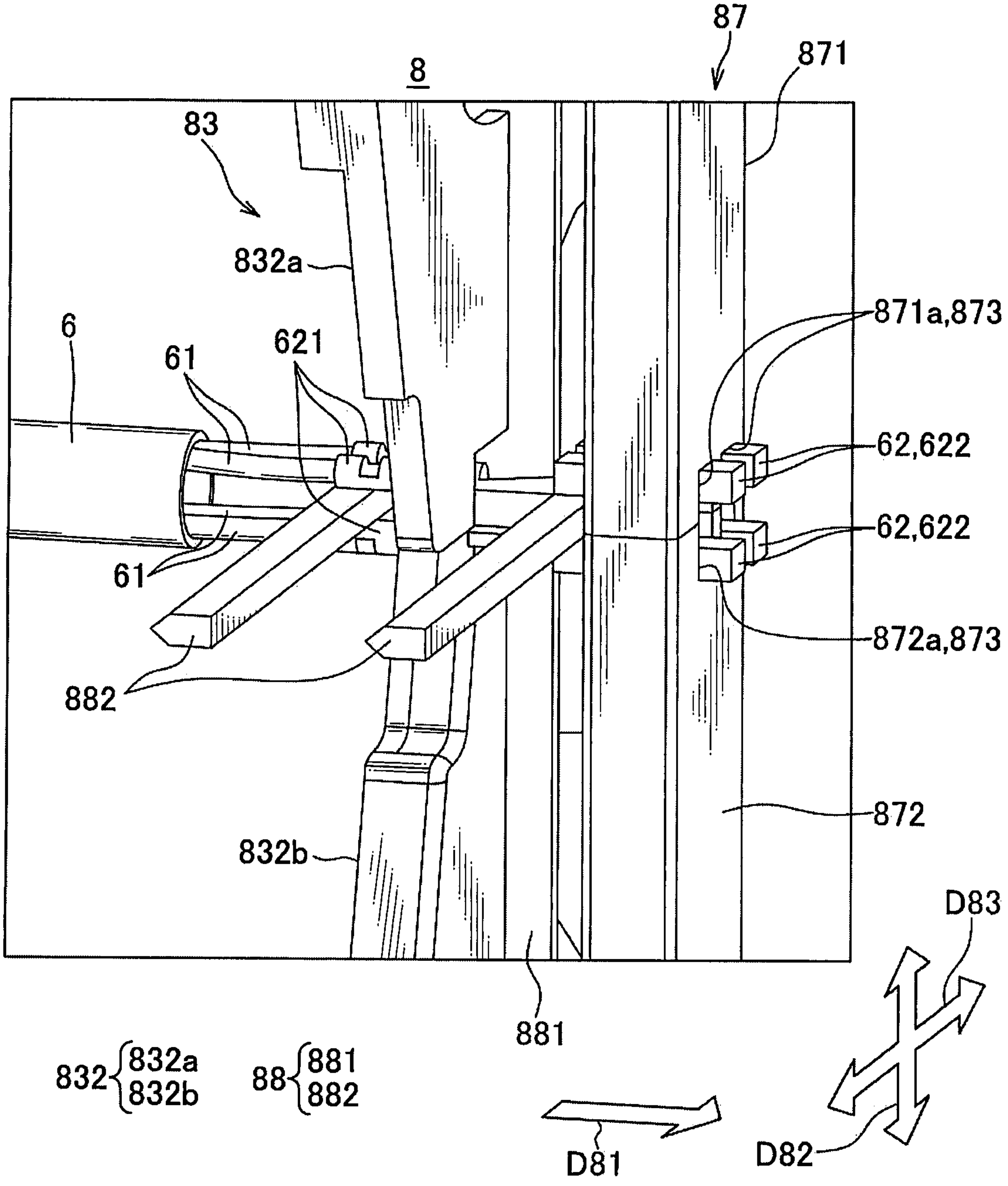
FIG. 15. shows a terminal insertion device according to a third embodiment of the present invention focused on a terminal chuck and a terminal guide.

FIG. 15 shows the terminal insertion device according to the third embodiment of the present invention focused on the terminal chuck and the terminal guide.

Similarly to the second embodiment, the terminal insertion device 8 according to the present embodiment is provided so that four connector terminals 62 are inserted into four terminal accommodating chambers arranged in parallel to each other in a not shown connector housing, wherein the connector terminals 62 are connected to respective ends of four electric wires 61 of a four-core shielded cable 6 by crimping.

According to the present embodiment, a terminal separator 88 similar to that of the second embodiment is provided, wherein the terminal separator 88 includes a single-plate first separator element 881 and two bar-shaped second separator elements 882. The first separator element 881 divides the four connector terminals 62 in the second direction D83 into two groups each having two connector terminals 62. One pair of the second separator elements 882 are arranged upstream and downstream of the terminal chuck 83 in an insertion direction D81 and divides the four connector terminals 62 in the first direction D82 into two groups each having two connector terminals 62.

With the terminal separator 88 including the first separator element 881 and the second separator elements 882, the four connector terminals 62 are divided so as to align their tips to inlets of four terminal accommodating chambers in a one-to-one manner which are arranged two-dimensionally. The divided four connector terminals 62 are then clamped and bundled by the terminal chuck 83 in two directions, i.e. in the first direction D82 and the second direction D83. The terminal chuck 83 clamps crimped portions 621 of the connector terminals 62 which are crimped to the electric wires 61.

Further, a terminal guide 87 according to the present embodiment includes an upper guide plate 871 and a lower guide plate 872. A lower end edge of the upper guide plate 871 and an upper end edge of the lower guide plate 872 are arranged to come into contact with each other. Two receiving grooves 871*a* are provided in the lower end edge of the upper guide plate 871, wherein two corresponding receiving grooves 872*a* are provided also in the upper end edge of the lower guide plate 872. When the end edges of the upper guide plate 871 and the lower guide plate 872 come into each other in the first direction D82, the upper receiving grooves 871*a*, 872*a* are connected vertically to the respective lower receiving grooves 872*a* to form two vertically elongate through holes 873. The through holes 873 guide the tips of the four connector terminals 62 to the inlets of the four terminal accommodating chambers in a one-to-one manner. Mated portions 622 of two upper connector terminals 62 are introduced through two receiving grooves 871*a* of the through holes 873 which are formed in the upper guide plate 871, wherein mated portions 622 of two lower connector terminals 62 are introduced through two receiving grooves 872*a* in the lower guide plate 872. The upper guide plate 871 and the lower guide plate 872 are configured so that their end edges are movable toward and away from each other to introduce and release the connector terminals 62.

Figure 16:
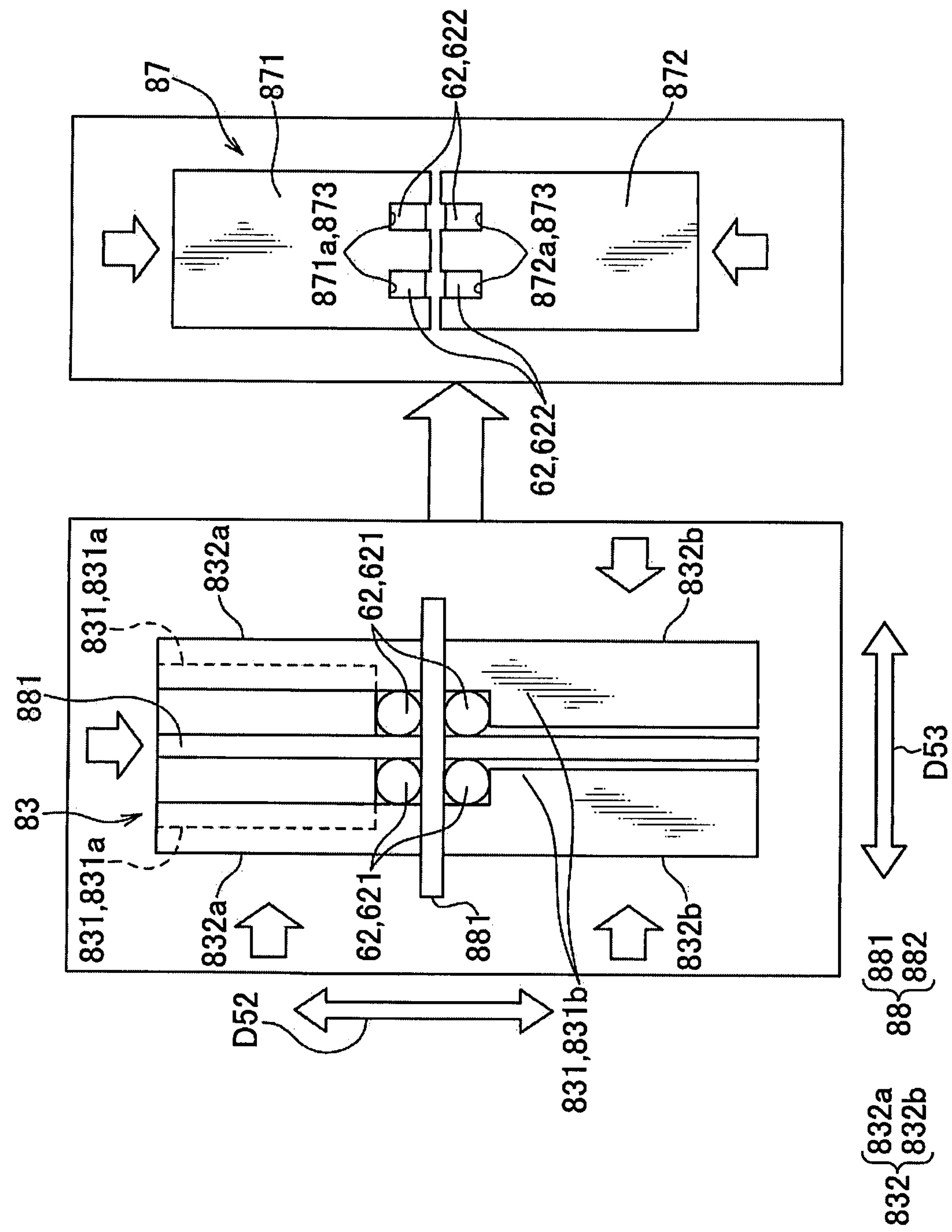
FIG. 16. is a schematic diagram illustrating a held state of connector terminals in a phase where mated portions of the connector terminals have been introduced through through holes of a terminal guide as shown in FIG. 15.

FIG. 16 is a schematic diagram illustrating a held state of connector terminals in a phase where mated portions of the connector terminals have been introduced through through holes of a terminal guide as shown in FIG. 15.

First, the crimped portions 621 of the four connector terminals 62 are clamped and bundled by the terminal chuck 83 in two directions, i.e. in the first direction D82 and in the second direction D83, with the terminal separator 88 being interposed between the crimped portions 621. At this time, one single-plate first separator element 881 is interposed in the first direction D82, while two bar-shaped second separator elements 882 are interposed in the second direction D83.

The terminal chuck 83 includes a pair of first chuck portions 831 and a pair of second chuck portions 832, wherein the pair of first chuck portions 831 clamps the four connector terminals 62 in the first direction D82 and the pair of second chuck portions 832 clamps the four connector terminals 62 in the second direction D83. Further, the second chuck portions 832 include an upper chuck 832*a* located in an upper region of the terminal accommodating device 8, and a lower chuck 832*b* located in a lower region of the terminal accommodating device 8 with reference to the first direction D82. The crimped portions 621 of two upper connector terminals 62 of the four connector terminals 62 which are divided into four as described above are clamped by the upper chuck 832*a*, while the crimped portions 621 of two lower connector terminals 62 are clamped by the lower chuck 832*b*.

The pair of first chuck portions 831 which are configured to clamp the connector terminals 62 in the first direction D52 includes upper portions 831*a* arranged at the first separator element 881. The pair of first chuck portions 831 further includes lower portions 831*b*, wherein one of the lower portions 831*b* is provided, facing the upper portions 831*a*, in each of the pair of lower chucks 832*b* which form second chuck portions 832. According to the present embodiment, the lower portions 831*b* are produced by forming a step-like recess in a portion of an upper end edge of each lower chuck 832*b* closer to the first separator element 881 so that an inner edge of the recess faces the upper portion 831*a*. According to the present embodiment, the first separator element 881 is configured to be movable together with the upper portions 831*a* in the first direction D82.

With regard to the first direction D82, the crimped portions 621 are clamped by the pair of first chuck portions 831 comprised of the lower portions 831*b* and the upper portions 831*a* lowered together with the first separator element 881. With regard to the second direction D83, the crimped portions 621 are clamped by the pair of second chuck portions 832. Further, two mated portions 622 of the connector terminals 62 are introduced through each of the two vertically elongate through holes 873 which are formed from the receiving grooves 871*a* in the upper guide plate 871 and the receiving grooves 872*a* in the lower guide plate 872 of the terminal guide 87.

Figure 17:
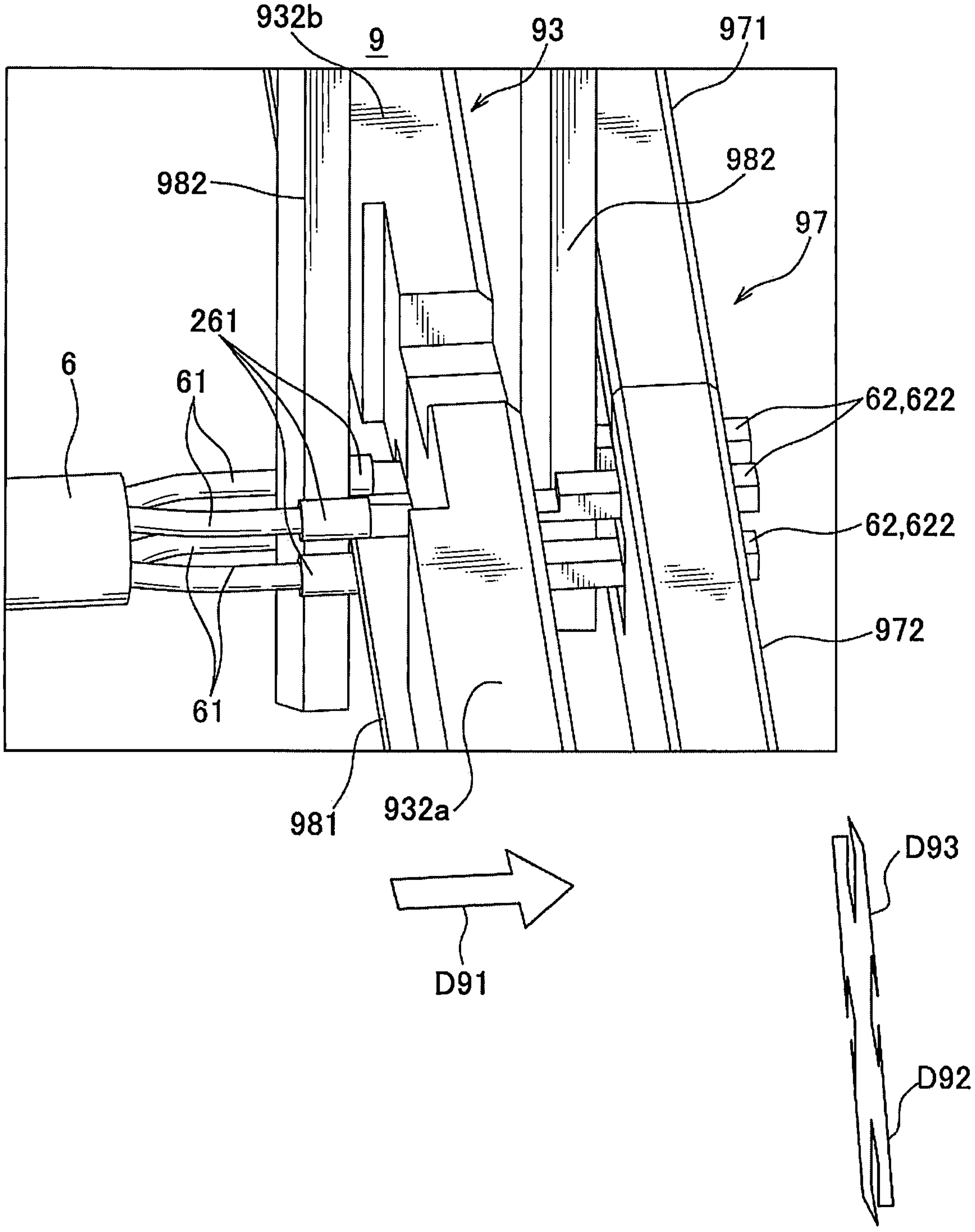
FIG. 17. shows an exemplar variation for the held state of the connector terminals according to the third embodiment as shown in FIGS. 15 and 16.
Figure 18:
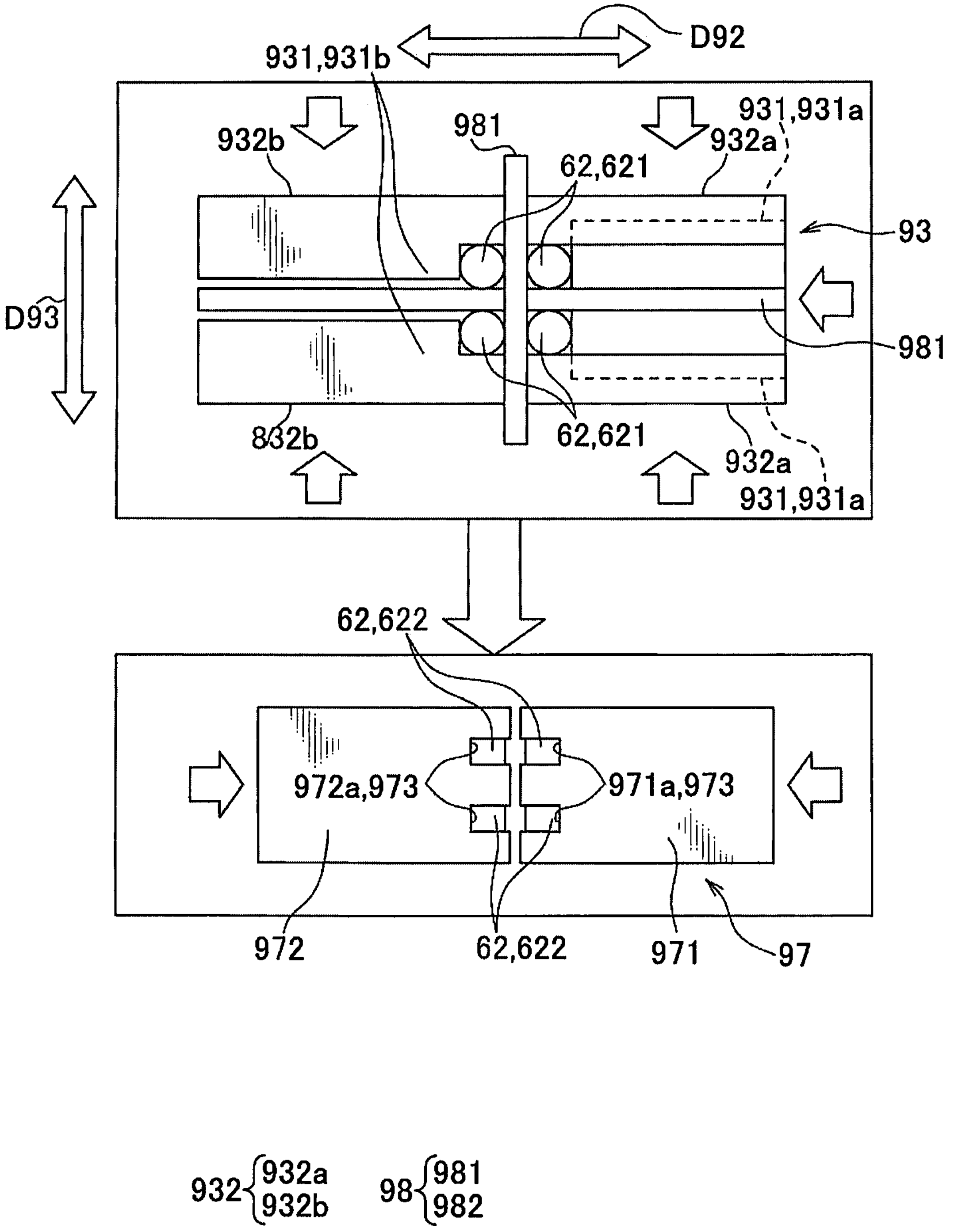
FIG. 18. is a schematic diagram illustrating a held state of the connector terminals according to the exemplar variation as shown in FIG. 17.

FIG. 17 shows an exemplar variation for the held state of the connector terminals according to the third embodiment as shown in FIGS. 15 and 16. FIG. 18 is a schematic diagram illustrating a held state of the connector terminals according to the exemplar variation as shown in FIG. 17.

A terminal accommodating device 9 according to the present exemplar variation include a terminal chuck 93, a terminal guide 97 and a terminal separator 98 which are configured with an orientation different by 90 degree from the terminal chuck 83, the terminal guide 87 and the terminal separator 88 according to the third embodiment respectively.

According to the present exemplar variation, the connector terminals 62 are clamped by a pair of first chucks 931 of the terminal chuck 93 in a first direction D92 which corresponds to the second direction D83 according to the third embodiment, wherein the connector terminals 62 are further clamped by a pair of second chucks 932 of the terminal chuck 93 according to the exemplar variation in a second direction D93 which corresponds to the first direction D82 according to the third embodiment.

The terminal separator 98 according to the present exemplar variation, which in FIG. 17 extends between a front side and a back side of the figure plane, includes a single-plate first separator element 981 which extends in the first direction D92 connecting the left and right sides in FIG. 18. Further, the terminal separator 98 includes two second separator elements 982 which have a bar shape extending in the second direction D93 connecting the upper and the lower side in both of FIGS. 17 and 18. The first separator element 981 divides the four connector terminals 62 in the second direction D93 into two groups each having two connector terminals 62. One pair of the second separator elements 982 are arranged upstream and downstream of the terminal chuck 93 in an insertion direction D91 and divides the four connector terminals 62 in the first direction D92 into two groups each having two connector terminals 62.

The divided four connector terminals 62 are then clamped and bundled by the terminal chuck 93 in two directions, i.e. in the first direction D92 and the second direction D93. The terminal chuck 93 clamps crimped portions 621 of the connector terminals 62.

Furthermore, the terminal guide 97 includes a first lateral guide plate 971 and a second lateral guide plate 972 in the first direction D92, wherein the first lateral guide plate 971 is arranged on the front side of the figure plane in FIG. 17 and on the right side in FIG. 18, while the second lateral guide plate 972 is located on a side opposite thereto. End edges of the first lateral guide plate 971 and the second lateral guide plate 972 are arranged so as to come into contact with each other. Two receiving grooves 971*a* are provided in the end edge of the first lateral guide plate 971, wherein two corresponding receiving grooves 972*a* are provided also in the end edge of the second lateral guide plate 972. When the end edges of the first lateral guide plate 971 and the second lateral guide plate 972 come into each other in the first direction D92, the receiving grooves 971*a*, 972*a* are connected to each other to form two laterally elongate through holes 973. The through holes 973 guide tips of the four connector terminals 62 to the inlets of the four terminal accommodating chambers in a one-to-one manner.

The terminal chuck 93 includes a pair of first chuck portions 931 and a pair of second chuck portions 932, wherein the pair of first chuck portions 931 clamps the four connector terminals 62 in the first direction D92 and the pair of second chuck portions 932 clamps the four connector terminals 62 in the second direction D93. Further, the second chuck portions 932 include a first lateral chuck 932*a* and a second lateral chuck 932*b* in the first direction D92, wherein the first lateral chuck 932*a* is arranged on the front side of the figure plane in FIG. 17 and on the right side in FIG. 18, while the second lateral chuck 932*b* is located on a side opposite thereto. Crimped portions 621 of two connector terminals 62 of the four connector terminals 62 which are divided into four as described above are clamped by the first lateral chuck 932*a*, the two connector terminals 62 being located on the right side in FIG. 18, wherein crimped portions 621 of two left connector terminals 62 are clamped by the second lateral chuck 932*b*.

The pair of first chuck portions 931 which are configured to clamp the connector terminals 62 in the first direction D92 includes right first portions 931*a* in FIG. 18 which are arranged at the first separator element 981. The pair of first chuck portions 931 further includes left second portions 931*b* in FIG. 18, wherein one of the second portions 931*b* is provided, facing the first portions 931*a*, in each of the pair of second lateral chucks 932*b* which form second chuck portions 932. Additionally, the first separator element 981 is configured to be movable together with the first portions 931*a* in the first direction D92.

With regard to the first direction D92, the crimped portions 621 are clamped by the pair of first chuck portions 931 comprised of the second portions 931*b* and the first portions 931*a* movable together with the first separator element 981. With regard to the second direction D93, the crimped portions 621 are clamped by the pair of second chuck portions 932. Further, two mated portions 622 of the connector terminals 62 are introduced through each of the two laterally elongate through holes 973 which are formed from the receiving grooves 971*a* in the first lateral guide plate 971 and the receiving grooves 972*a* in the second lateral guide plate 972 of the terminal guide 97.

Similarly, it is obvious that the terminal accommodating device 8, 9 according to the second embodiment and its exemplar variation as described above enable insertion of the connector terminals 62 into the terminal accommodating chambers in the connector housing, with the connector terminals 62 being connected to the respective tips of the electric wires 61 by crimping, while reducing the separation length for the four electric wires 61 in the shielded cable 6.

Similarly to the second embodiment and its exemplar variation as described above, the present embodiment and its exemplar variation further enable the four connector terminals 62 to be bundled better so that their tips are allocated in a one-to-one manner to the inlets of the four terminal accommodating chambers which are arranged two-dimensionally. Moreover, similarly to the second embodiment and its exemplar variation, the certainty for insertion of the connector terminals 62 can be further improved with one pair of bar-shaped second separator elements 882, 982 which are arranged upstream and downstream of the terminal chuck 93.

It is to be noted that the embodiments as described above merely show representative configurations for the present invention and the present invention is not limited thereto. I.e., the embodiments may be modified and implemented in various manners within a scope which does not depart from the core of the present invention. It is obvious that such modifications are also included in the scope of the present invention as far as they include features of a terminal insertion device according to the present invention.

E.g. as examples for electric wires according to the present invention, the above-described embodiments show electric wires 21, 61 which form a two-core or four-core shielded cable 2, 6. However, the electric wires according to the present invention are not limited thereto. The electric wires according to the present invention may be any electric wires with connector terminals connected to their ends by crimping, regardless of the concrete configuration, e.g. regardless of the number of the electric wires and/or whether or not they are twisted or shielded.

Further, as examples for the connector housing according to the present invention, the above-described embodiments show connector housings with two or four terminal accommodating chambers which accommodate the mated portions 222, 622 of the connector terminals 22, 62. However, the connector housing according to the present invention is not limited thereto. The connector housing according to the present invention may be any connector housing having terminal accommodating chambers which accommodate the entire connector terminals e.g. including mated portions or a part of them. Further, any number of the terminal accommodating chambers may be selected which is equal to or larger than the number of connector terminals to be inserted.

Furthermore, as examples for the terminal insertion device according to the present invention, the above-described embodiments show terminal accommodating devices 1, 5, 8, 9 with terminal guides 17, 47, 57, 87, 97. However, the terminal insertion device according to the present invention is not limited thereto, and it may be configured without a terminal guide as described above e.g. depending on a size of the connector terminals to be inserted. However, as described above, further improvement of certainty for insertion of the connector terminals can be achieved by providing the terminal guide.

Reference Signs List

| | |
|---|---|
| 1, 5, 8, 9 | Terminal insertion device |
| 2, 6 | Shielded cable |
| 3 | Connector housing |
| 11 | Cable holder |
| 12 | Cable chuck |
| 12a | Accommodating space |
| 13, 43, 53, 73, 83, 93 | Terminal chuck |
| 14 | First moving mechanism |
| 15 | Terminal support |
| 16 | Second moving mechanism |
| 17, 47, 57, 77, 87, 97 | Terminal guide |
| 18, 48, 58, 78, 88, 98 | Terminal separator |
| 21, 61 | Electric wires |
| 22, 62 | Connector terminals |
| 31 | Terminal accommodating chambers |
| 111 | Holding mechanism |
| 112 | Actuation cylinder |
| 121 | Chuck portion |
| 131, 531, 831, 931 | First chuck portion |
| 131a, 531a, 831a | Upper portion |
| 131b, 531b, 831b | Lower portion |
| 132, 532, 832, 932 | Second chuck portion |
| 171, 571, 871, 971 | Guide plate |
| 171a, 571a, 871a, 872a, 971a, 972a | Receiving grooves |
| 171b | End edge |
| 171c, 571c, 873, 973 | Through holes |
| 172, 572 | Lid element |
| 172a | Oblique surface |
| 221, 621 | Crimped portions |
| 222, 622 | Mated portions |
| 832a | Upper chuck |
| 832b | Lower chuck |
| 871 | Upper guide plate |
| 872 | Lower guide plate |
| 581, 881, 981 | First separator element |
| 582, 882, 982 | Second separator element |
| 931a | First portions |
| 931b | Second portions |
| 932a | First lateral chuck |
| 932b | Second lateral chuck |
| D11, D51, D81, D91 | Insertion direction |
| D12, D52, D82, D92 | First direction |
| D13, D53, D83, D93 | Second direction |
| D14, D15, D16, D17 | Arrow |
| D111 | Opposite direction |

What is claimed is:

1. A terminal insertion device for inserting a plurality of connector terminals into a plurality of terminal accommodating chambers arranged in parallel to each other in a connector housing, each of the plurality of connector terminals being connected to an end of each of a plurality of electric wires by crimping, comprising:

a terminal separator configured to be interposed between the plurality of connector terminals so that tips of the plurality of connector terminals are allocated to inlets of the plurality of terminal accommodating chambers in a one-to-one manner when the plurality of connector terminals are bundled extending along an insertion direction into the plurality of terminal accommodating chambers;

a terminal chuck configured to clamp and bundle the plurality of connector terminals in two directions, with the terminal separator interposed between the plurality of connector terminals, wherein one of the two directions is a first direction intersecting the insertion direction and another of the two directions is a second direction intersecting the insertion direction as well as the first direction; and a moving mechanism configured to move at least one of the connector housing and the plurality of connector terminals held by the terminal separator and the terminal chuck to insert the plurality of connector terminals into the plurality of terminal accommodating chambers.

2. The terminal insertion device according to claim 1, wherein the terminal separator comprises a separator element which extends in the first direction and configured to be interposed between the plurality of connector terminals, wherein the terminal chuck comprises a pair of first chuck portions and a pair of second chuck portions, wherein the pair of first chuck portions is configured to clamp the plurality of connector terminals in the first direction and the pair of second chuck portions is configured to clamp the plurality of connector terminals in the second direction, and wherein one portion of the pair of first chuck portions is arranged at the separator element and movable together with the separator element in the first direction.

3. The terminal insertion device according to claim 2, wherein another portion of the pair of first chuck portions extends out of each of the pair of second chuck portions so as to face the one portion.

4. The terminal insertion device according to claim 1, wherein the plurality of terminal accommodating chambers is arranged so that inlets of the plurality of terminal accommodating chambers are arranged two-dimensionally in the first direction and the second direction in a top view on the connector housing in the insertion direction, wherein the terminal separator comprises a first separator element and a second separator element, the first separator element extending in the first direction and being configured to be interposed between the plurality of connector terminals, and the second separator element extending in the second direction and being configured to be interposed between the plurality of connector terminals.

5. The terminal insertion device according to claim 4, wherein one pair of first separator elements or second separator elements is arranged upstream and downstream of the terminal chuck in the insertion direction.

6. The terminal insertion device according to claim 1, further comprising:

a terminal guide configured to be located closer to the connector housing than the terminal chuck in the insertion direction during movement by the moving mechanism and to guide the tips of the plurality of connector terminals by allocating them to the inlets of the plurality of terminal accommodating chambers in a one-to-one manner.

7. The terminal insertion device according to claim 6, wherein each of the plurality of connector terminals comprises a crimped portion to be crimped to the end of each of the plurality of electric wires, and a mated portion to be mated with a partner terminal, wherein the terminal chuck is configured to clamp crimped portions of the plurality of connector terminals together, and wherein the terminal guide comprises a plurality of through holes which guides respective mated portions of the plurality of connector terminals therethrough in the insertion direction to the inlets of the plurality of terminal accommodating chambers.

8. The terminal insertion device according to claim 6, wherein the terminal guide comprises:

a guide plate extending in a plate shape along an intersecting plane intersecting the insertion direction, wherein the guide plate has a plurality of receiving grooves which is formed from an end edge of the guide plate and configured to receive the plurality of connector terminals so that the tips of the plurality of connector terminals project out to the inlets of the plurality of terminal accommodating chambers in a one-to-one manner from a side facing the connector housing; and a lid element configured to come into contact with the end edge so as to cover the plurality of receiving grooves with the plurality of connector terminals received thereinto.

* * * * *